US008674582B2

(12) United States Patent
Nakatsuka et al.

(10) Patent No.: US 8,674,582 B2
(45) Date of Patent: Mar. 18, 2014

(54) VIBRATION POWER GENERATOR, VIBRATION POWER GENERATING DEVICE AND COMMUNICATION DEVICE HAVING VIBRATION POWER GENERATING DEVICE MOUNTED THEREON

(75) Inventors: Hiroshi Nakatsuka, Osaka (JP); Keiji Onishi, Osaka (JP); Koji Nomura, Nara (JP)

(73) Assignee: Panasonic Corporation, Osaka (JP)

( * ) Notice: Subject to any disclaimer, the term of this patent is extended or adjusted under 35 U.S.C. 154(b) by 322 days.

(21) Appl. No.: 12/937,766

(22) PCT Filed: Sep. 29, 2009

(86) PCT No.: PCT/JP2009/004983
§ 371 (c)(1),
(2), (4) Date: Dec. 15, 2010

(87) PCT Pub. No.: WO2010/035507
PCT Pub. Date: Apr. 1, 2010

(65) Prior Publication Data
US 2011/0109195 A1  May 12, 2011

(30) Foreign Application Priority Data

Sep. 29, 2008  (JP) ................................. 2008-249823

(51) Int. Cl.
*H02N 1/00* (2006.01)
(52) U.S. Cl.
USPC ............................ 310/309; 310/300; 322/2 A
(58) Field of Classification Search
USPC .................................. 310/300, 309; 322/2 A
See application file for complete search history.

(56) References Cited

U.S. PATENT DOCUMENTS

| 4,509,527 | A  | * | 4/1985  | Fraden | 600/484 |
| 5,487,790 | A  | * | 1/1996  | Yasuda | 136/200 |
| 7,956,497 | B2 | * | 6/2011  | Murayama et al. | 307/400 |
| 8,018,119 | B2 | * | 9/2011  | Matsubara et al. | 310/309 |
| 8,076,893 | B2 | * | 12/2011 | Dong et al. | 318/686 |
| 8,384,267 | B2 | * | 2/2013  | Naruse et al. | 310/309 |

(Continued)

FOREIGN PATENT DOCUMENTS

| JP | 11-164495   | 6/1999 |
| JP | 2005-529574 | 9/2005 |
| JP | 2008-86190  | 4/2008 |
| JP | 2008-191780 | 8/2008 |

(Continued)

OTHER PUBLICATIONS

English translation of International Preliminary Report on Patentability and Written Opinion of the International Searching Authority, issued May 10, 2011 in PCT/JP2009/004983.
International Search Report issued Dec. 28, 2009 in International (PCT) Application No. PCT/JP2009/004983.

*Primary Examiner* — Burton Mullins
(74) *Attorney, Agent, or Firm* — Wenderoth, Lind & Ponack, L.L.P.

(57) ABSTRACT

A vibration power generating device includes a first substrate and a second substrate, a first electrode formed on the first substrate, a fixed structural body, elastic structural bodies which connect the first substrate and the fixed structural body with each other, and a second electrode formed on the second substrate. Since the overlapping area of the electrodes is increased by arranging rectangular or square conductor parts of the first electrode and rectangular or square conductor parts of the second electrode in a checkerboard pattern, a generation region where power is generated by vibration is increased.

17 Claims, 15 Drawing Sheets

(56) References Cited

U.S. PATENT DOCUMENTS

| | | |
|---|---|---|
| 2004/0007877 A1 | 1/2004 | Boland et al. |
| 2004/0016120 A1 | 1/2004 | Boland et al. |
| 2007/0029894 A1* | 2/2007 | Yamaoka et al. ............. 310/311 |
| 2007/0217635 A1* | 9/2007 | Ogura et al. ................. 381/191 |
| 2008/0048521 A1* | 2/2008 | Mabuchi et al. ............. 310/309 |
| 2009/0079295 A1* | 3/2009 | Naruse et al. ................ 310/300 |
| 2009/0140443 A1* | 6/2009 | Hohlfeld et al. .............. 257/786 |

FOREIGN PATENT DOCUMENTS

| | | |
|---|---|---|
| WO | 03/105305 A2 | 12/2003 |
| WO | 03/105305 A3 | 12/2003 |
| WO | 2005/050680 | 6/2005 |

* cited by examiner (a)

(b)

VIBRATION POWER GENERATOR, VIBRATION POWER GENERATING DEVICE AND COMMUNICATION DEVICE HAVING VIBRATION POWER GENERATING DEVICE MOUNTED THEREON

BACKGROUND OF THE INVENTION

I. Technical Field

The present invention relates to a vibration power generator, a vibration power generating device, and a communication device having the vibration power generating device mounted thereon. In particular, the present invention relates to a static induction vibration power generator using an electret, a vibration power generating device, and a communication device having the vibration power generating device mounted thereon.

II. Description of the Related Art

A static induction vibration power generating device in which electric charges are provided to one electrode of a variable capacitance, and the electrode charges are induced to the opposed electrode by a static induction, a change in the induced electric charges is brought about by a change in capacitance, and the change in the electric charges is extracted as electrical energy, has been already proposed (refer to, for example, JP 2005-529574A (P. 10 to 11, FIG. 4) shown below).

FIG. 14 shows a static induction vibration power generator described in the aforementioned JP 2005-529574A (P. 10 to 11 FIG. 4). FIG. 14 is a schematic cross-sectional view of a vibration power generator 10 using an electret.

The vibration power generator 10 is composed of a first substrate 11 having a plurality of conductive surface regions 13 and a second substrate 16 having a plurality of electret material regions 15. The first substrate 11 and the second substrate 16 are disposed so as to have a predetermined clearance each other. The second substrate 16 including the electret material regions 15 is fixed. The first substrate 11 including the conductive surface regions 13 is coupled to a fixation structure 17 through springs 19. The springs 19 are connected to the both side surfaces of the first substrate 11, and also connected to the fixation structure 17. The first substrate 11 is capable of returning to its home position due to the springs 19, or the first substrate 11 makes a lateral motion (for example, an X-axial motion) to be capable of returning to the home position. This movement brings about increase and decrease of the overlapping area between the electret material regions 15 and the opposed conductive surface regions 13, which results in a change of electric charges in the conductive surface regions 13. A static induction vibration power generator performs electrical generation by extracting the change of electric charges as electrical energy.

However, in the static induction vibration power generator of FIG. 14, the first substrate is regulated so as not to vibrate in the directions other than the direction of the X-axis (the direction of an arrow 18 in the drawing). Therefore, this static induction vibration power generator 100 is incapable of extracting external vibrations in the directions other than the direction of the X-axis as electrical energy. In order to solve the problem, a static induction vibration power generator which is capable of utilizing external vibrations in many directions for electrical generation is proposed (refer to, for example, JP 2008-86190(P. 6 to 7, FIG. 6) shown below).

FIGS. 15(a) and (b) show a static induction vibration power generator described in the aforementioned JP 2008-86190(P. 6 to 7, FIG. 6). FIG. 15 are schematic cross-sectional views of a vibration power generator using an electret.

In a vibration power generator 20 shown in FIG. 15, an electret electrode 22C and a variable electrode 25C respectively include a plurality of electrode pads 22L and 25L which are arranged in a two-dimensional array. Therefore, it is relatively easy to equalize an amount of change in an overlapping area between the variable electrode 25C and the electret electrode 22C, which is brought about when the variable electrode 25C moves by a predetermined distance only in the direction of the X-axis (arrows 27a) to an amount of change in the overlapping area which is brought about when the variable electrode 25C moves by the predetermined distance only in the direction of the Y-axis (arrows 27b). Further, the vibration power generator shown in FIG. 15 has a structure in which it is possible to equalize the amounts of electricity generated when moving by a same distance in the direction of the X-axis and the direction of the Y-axis, to be capable of performing electrical generation responding to external vibrations not only in the direction of the X-axis, but also in the direction of the Y-axis.

The electret itself is already known. For example, an organic high molecular weight polymer (FEP (copolymer of tetrafluoroethylene and hexafluoroethylene)) is already known as a material for an electret. Further, a silicon dioxide film is known as an inorganic material, and further, a configuration in which a silicon dioxide film is covered with an insulating film to prevent electric charge leakage is proposed (refer to, for example, WO 2005/050680 (P. 2, FIG. 3) shown below).

SUMMARY OF THE INVENTION

Meanwhile, the vibration power generator shown in the aforementioned JP 2008-86190(P. 6 to 7, FIG. 6) has a structure in which an electret electrode is not arranged around the electret electrode 22C in order to convert a vibration in an arbitrary direction in an X-Y plane into electric power. As a result, as compared with a vibration power generator of the same size, a region on which an electret electrode is allowed to be arranged (a total area of the electret electrode) is decreased. Therefore, the vibration power generator has the problem that its amount of electricity generated is decreased to be less than that of the configuration described in the JP 2005-529574A (P. 10 to 11, FIG. 4) when comparing their amounts of electricity generated in one vibrating direction (only in the direction of the X-axis or the Y-axis).

Further, in the vibration power generator shown in the JP 2008-86190 (P. 6 to 7. FIG. 6), since the electret electrode is split, it is necessary to provide wiring and the like to connect therebetween. The fact brings about the problem as well that the structure and processes get complex and the like.

The present invention has been achieved in order to solve the problems in the aforementioned conventional vibration power generator. An object of the present invention is to provide a vibration power generator in which a region on which electret electrodes are arranged (i.e., a total area of the electret electrode) is increased, to increase an amount of electricity generated. Moreover, an object of the present invention is to provide a vibration power generator whose electrical generating efficiency is improved. Moreover, an object of the present invention is to provide a vibration power generating device and a communication device having the vibration power generating device mounted thereon by use of such a vibration power generator.

The present invention provides a vibration power generator comprising:
a first electrode formed on a first substrate, and
a second electrode formed on a second substrate, in which any one of the first electrode and the second electrode is capable of vibrating in a first-axial direction in a plane parallel to the first and second substrates, and a second-axial direction perpendicular to the first-axial direction, the first electrode has a configuration in which rectangular or square conductor parts having sides parallel to the first-axial direction and the second-axial direction are arranged in a checkerboard pattern on the first substrate, the second electrode has a configuration in which rectangular or square conductor parts having sides parallel to the first-axial direction and the second-axial direction are arranged in a checkerboard pattern on the second substrate, any one of the first electrode and the second electrode includes a film retaining electric charges, and the first electrode and the second electrode face each other so as to have a clearance therebetween.

In the vibration power generator of the present invention, the first electrode which is an electret electrode and the second electrode which is a sensing electrode respectively have the configurations in which rectangular or square conductor parts are arranged in a checkerboard pattern. The vibration power generator of the present invention performs electrical generation by utilizing that one of the first and second electrodes vibrates in the first-axial direction in a surface parallel to the substrate (for example, the direction of the X-axis) or a direction perpendicular to the first-axial direction (for example, Y-axis direction) by an externally-applied force, thereby changing an overlapping area between the conductor parts of the first electrode and the conductor parts of the second electrode. In accordance with this configuration, it is possible to increase the overlapping area between the electret electrode and the sensing electrode, and as a result, it is possible to increase a region in which electrical generation by vibration is possible, which brings about increase in amount of electricity generated. Further, in accordance with this configuration, it is possible for the conductive parts composing the electret electrode to be simply electrically connected to one another on the substrate, which makes it possible to reduce the number of processes for manufacturing.

The vibration power generator of the present invention may further comprise a fixation structure, in which the fixation structure and the first substrate are connected through an elastic structure, the second substrate and the fixation structure are fixed each other, a spring constant in the first-axial direction of the elastic structure which causes the first substrate to vibrate in a direction parallel to the first-axial direction and a spring constant in the second-axial direction of the elastic structure which causes the first substrate to vibrate in a direction parallel to the second-axial direction are different from each other.

In accordance with this configuration, resonant frequencies of vibrations of the first substrate in the first-axial direction (the direction of the X-axis) and the second-axial direction (the direction of the Y-axis) become different values, which makes it possible to prevent the first substrate from being displaced in directions other than the first-axial direction and the second-axial direction (for example, an oblique direction at a sharp angle is 45 degrees to the first-axial direction). As a result, in the vibration power generator of the present invention, it is possible to prevent decrease in amount of electricity generated. In the case where the fixation structure is connected to the second substrate through the elastic structure as well, a spring constant of the elastic structure is selected in the same way as described above, which makes it possible to obtain the same effect.

The present invention further provides a vibration power generator comprising:

a first electrode formed on a first substrate, and a second electrode formed on a second substrate, in which any one of the first electrode and the second electrode is capable of vibrating at least in one of a first-axial direction in a plane parallel to the first and second substrates and a second-axial direction perpendicular to the first-axial direction, the first electrode has a configuration in which a plurality of conductor parts are arranged on the first substrate, the second electrode has a configuration in which a plurality of conductor parts are arranged on the second substrate, any one of the first electrode and the second electrode comprises a film retaining electric charges, the first electrode and the second electrode face each other so as to have a clearance therebetween, and a circumscribed area of a region on which the second electrode is formed on the second substrate is larger than a circumscribed area of a region on which the first electrode is formed on the first substrate.

In accordance with this configuration, even in the case where the first substrate is greatly displaced with respect to the second substrate, it is possible to keep an overlapping area between the electret electrode and the sensing electrode constant so as not to be changed from an area in an initial state (i.e., a non-vibrating state). As a result, it is possible to keep an amount of electricity generated constant regardless of a displacement magnitude (or amplitude) of the first substrate.

The present invention provides a vibration power generating device including the vibration power generator of the present invention. The vibration power generating device of the present invention has a greater amount of electricity generated as compared with a vibration power generating device including a vibration power generator which is nearly equal in size (in particular, a circumscribed area of a region on which the electrode is formed) to the conventional vibration power generator.

The vibration power generating device of the present invention may include an electric storage circuit. Due to the vibration power generating device including the electric storage circuit, in the case where electric power output from the vibration power generator is high, it is possible to store the electric power in the electric storage circuit. The electric power stored in the electric storage circuit is supplied in the case where electric power output from the generator is lowered; thereby it is possible to stabilize the output from the vibration power generating device.

The present invention further provides a communication device including the vibration power generating device of the present invention. The communication device of the present invention is capable of decreasing the number of battery exchanges, or it is possible to make battery exchange unnecessary as usage.

Advantageous Effects of Invention

In accordance with the vibration power generator of the present invention, one of the two electrodes facing each other receives an externally-applied force to vibrate in the direction of the X-axis and the direction perpendicular to the X axis (the direction of the Y-axis), and it is possible to convert the vibration into electric power without decreasing the electrical generating efficiency. Further, the vibration power generating device of the present invention includes the vibration power generator of the present invention that is capable of supplying electric power at a relatively high output. Moreover, in the case where the vibration power generating device of the present invention includes an electric storage circuit, it is possible to stabilize an output voltage. It is possible for the vibration power generator of the present invention to function as a power source for a communication device. Since the vibration power generating device of the present invention is capable of performing electrical generation by an externally-applied force (for example, a force applied when a person is walking, a vibration applied when driving a car, or the like), the communication device using the vibration power generating device of the present invention is capable of reducing the number of maintenances such as battery exchanges, which is advantageous in view of resource saving and environmental protection.

DETAILED DESCRIPTION OF THE INVENTION

Hereinafter, embodiments of the present invention will be described with reference to the accompanying drawings.

First Embodiment

Figure 1:
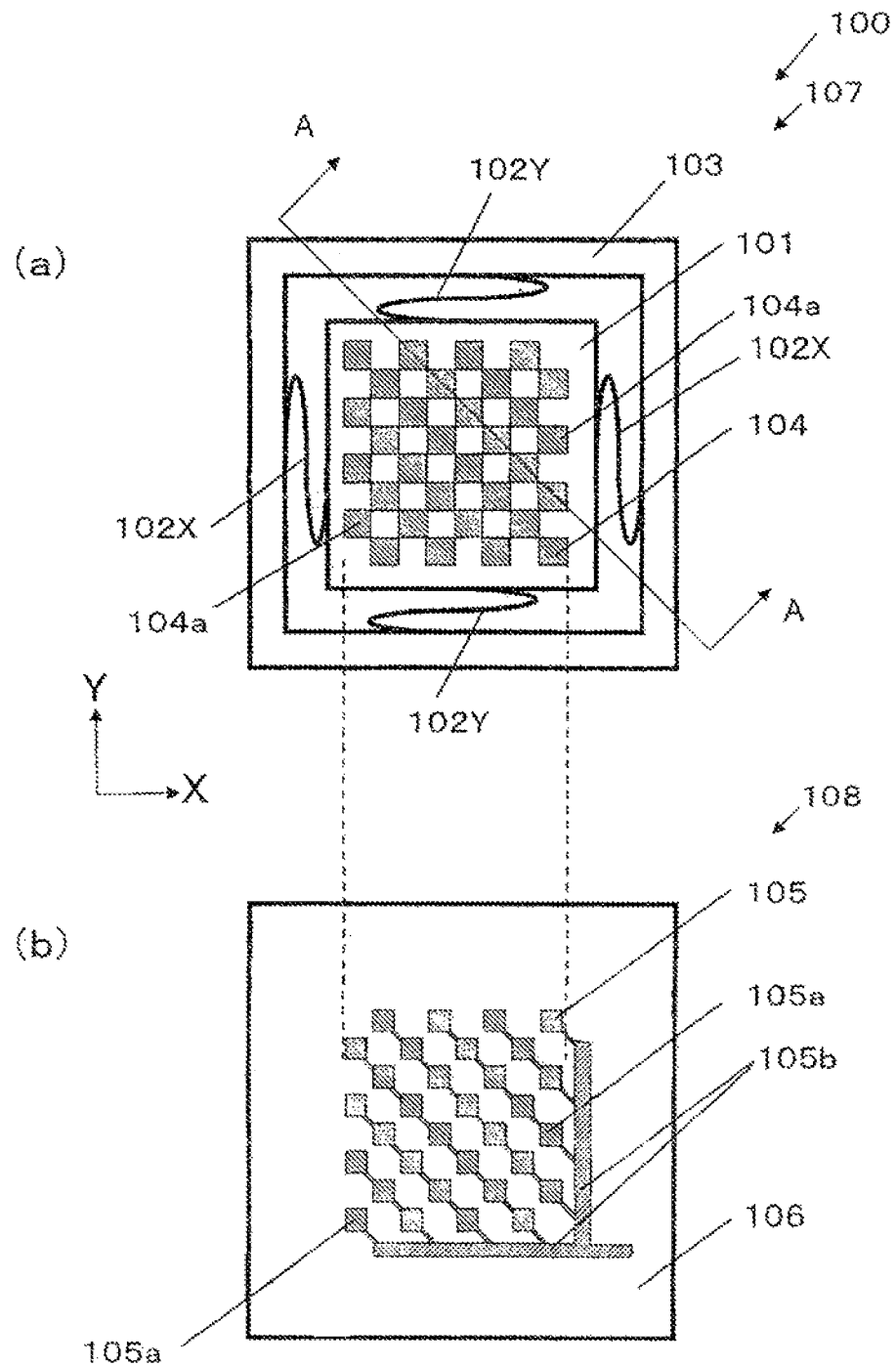
FIG. 1(a) is a top view of a vibration power generator according to a first embodiment of the present invention.
FIG. 1(b) is a top view showing the arrangement of a second electrode in the vibration power generator shown in FIG. 1(a).

FIG. 1 shows a vibration power generator according to a first embodiment of the present invention. FIG. 1(a) is a top view of a vibration power generator 100, and FIG. 1(b) is a top view of a second structure 108 including a second substrate 106 on which a second electrode 105 is formed. Meanwhile, in FIG. 1(a), a first electrode 104 formed on a first substrate 101 is shown in order to facilitate understanding. In the actual vibration power generator, the first electrode and the second electrode face each other, and those are therefore not shown in appearance.

The vibration power generator 100 is composed of a first structure 107 and the second structure 108. The first structure 107 includes the first substrate 101 and a fixation structure 103, and the first electrode 104 is formed on the first substrate 101. The first substrate 101 is connected to the fixation structure 103 with elastic structures 102X and 102Y, and is capable of vibrating in the direction of the X-axis and the direction of the Y-axis illustrated.

The elastic structures 102X and 102Y have the characteristics that those expand and contract by an externally-applied force to vibrate the first substrate 101. Specifically, the elastic structure may be springs or a structure using an elastomer material (for example, parylene resin). Alternately, the elastic structure may be formed so as to partially leave the semiconductor substrate as bridges between the both at the time of manufacturing the fixation structure 103 and the first substrate 101 by processing one silicon semiconductor substrate (for example, deep RIE). By appropriately selecting shapes and dimensions of the bridge-shaped portions, it is possible for the silicon semiconductor substrate to function as an elastic structure.

The second structure 108 includes the second electrode 105, and the second electrode 105 is formed at a position on the second substrate 106 and facing the first electrode 104.

The first structure 107 and the second structure 108 are positioned such that the first electrode 104 and the second electrode 105 face each other, to be connected to one another. More specifically, in the embodiment shown in FIG. 1, the two structures 100 and 108 are positioned such that the portions without conductor parts 104a of the first electrode 104 (approximate square blank parts) and conductor parts 105a of the second electrode 105 are overlapped and a region on which the second electrode 105 is formed does not protrude from a region on which the first electrode 104 is formed.

The connection between the two structures 107 and 108 is made such that a part or the entire region of the fixation structure 103 is connected to the second substrate 106. The connection may be made by use of an adhesive or the like, or may be made by utilizing eutectic bonding. Alternately, as long as it is possible to control a distance between the two opposed electrodes as desired, other connection means (for example, solder) may be used. In this way, by fixing the second substrate 106 and the fixation structure 103, the first electrode 104 formed on the first substrate 101 is structured to be relatively displaceable with respect to the second substrate.

The distance between the first electrode 104 and the second electrode 105 depends on dimensions of the fixation structure 103 and an electret, but is generally set to several μm to several-hundred μm, and particularly about several μm to about 30 μm. A distance between the two electrodes is a distance between the conductor parts composing the respective electrodes, or the surfaces of the layers when other layers are formed thereon.

As the first substrate 101 and the second substrate 106, for example, glass substrates or semiconductor substrates may be utilized. As a semiconductor substrate, for example, a high-resistance silicon semiconductor substrate or an SOI substrate may be used.

Next, the electrode arrangement will be described. The first electrode 104 and the second electrode 105 have a plurality of generally square conductor parts 104a and 105a. These conductor parts 104a and 105a are arranged in a checkerboard pattern (or checkers) as shown in FIG. 1(*a*) and FIG. 1(*b*). That is, the generally square conductor parts 104a (or 105a) and blank parts (the portions without the conductor parts 104a (or 105a)) are alternately arranged in one line, and in the line, blank parts are arranged on the conductor parts 104a (or 105a) in the previous line and the conductor parts 104a (or 105a) are arranged adjacent to the blank parts in the previous line. In the first electrode 104, the conductor parts 104a are each electrically connected in its four corners (four angles) to another conductor part 104a. In the second electrode 105, differently from the first electrode 104, since the area of each of the conductor parts 105a is smaller than each area of the portions without conductors which are located on the left, right, top, and bottom thereof (the white portions located between the portions of hatchings in FIG. 1), the entire electrical connection of the conductor parts 105a is assured by connecting at least one of the four corners with a thin conductor part (wiring electrode). In the illustrated embodiment, the conductor parts 105a are connected to a common wiring 105b extending in the directions of the X-axis and Y-axis, and the common wiring 105b is used for outputting electric power to the outside.

The first electrode 104 and the second electrode 105 (i.e., the conductor parts 104a and 105a thereof) are formed of materials having conductivity. The materials having conductivity may be copper, silver, gold, iron or aluminum, or an alloy composed of these metals, or silicon or polysilicon doped with impurities. The conductor parts of the first electrode 104 and the second electrode 105 may be formed by a method of patterning (including formation of conducting layer and formation of a predetermined pattern by etching) used in the field of wiring board. Alternately, the conductor parts of the electrodes may be formed by, for example, a spattering technique, a vapor-deposition technique, or a CVD method using a mask.

Next, the film retaining electric charges (i.e., an electret) composing the first electrode 104 will be described. The first electrode 104 has not only the conductor parts 104a, but also a film-type electret retaining electric charges. As a material composing the electret, a polymer material such as polypropylene, polyester terephthalate or polyvinyl chloride, or an inorganic material such as silicon oxide may be exemplified. In the vibration power generator of the present invention including the illustrated embodiment, it is desirable that silicon oxide excellent in dielectric strength voltage and heat resistance is used as a material for the electret.

Further, in order to improve the humidity resistance, it is desirable that silicon oxide is entirely covered on the periphery with an insulating film such as silicon nitride film. That is, it is preferable that the silicon oxide film is sealed up with the insulating film such that any surface (the top surface, the bottom surface or the side surfaces) of the membrane the silicon oxide film is not exposed, and is not allowed to directly contact another film or substrate. The details of such a configuration will be described in detail.

The operation of the vibration power generator configured as described above will be described.

When a force or a vibration is externally applied to the vibration power generator 100, the elastic structure 102X and/or 102Y expands and contracts, thereby the first substrate 101 vibrates in the direction of the X-axis or the direction of the Y-axis, to be relatively displaced with respect to the second substrate 106. This relative displacement brings about increase and decrease of the overlapping area between the conductor parts 104a of the first electrode 104 and the conductor parts 105a of the second electrode 105. According to the increase and decrease of the overlapping area, the amount of electric charges induced to the second electrode 105 is increased or decreased. The increase and decrease of electric charges is extracted as electrical energy, to generate electric power. Further, as long as the first substrate 101 continues vibrating, the increase and decrease of the overlapping area is continued.

In accordance with the vibration power generator 100 according to the embodiments of the present invention, it is possible to obtain the following effects.

(1) When a force or a vibration is externally applied, it is possible to convert the vibrations of the substrate in the direction of the X-axis and the direction perpendicular to the X axis (Y-axis direction) into electric power without decreasing the electrical generating efficiency.

(2) Electrical connection of the electret electrodes is easy.

The detailed explanation of the effect of the above-described (1) will be made. The first electrode 104 and the second electrode 105 have patterns on which the conductor parts 104a and 105b are arranged in a checkerboard pattern (checkerboard form). Further, the increase and decrease of the overlapping area between the conductor parts in the case where the first substrate 101 vibrates in the direction of the X-axis is substantially the same as the increase and decrease of the overlapping area in the case where the first substrate 101 vibrates in the direction of the Y-axis. Therefore, the amount of electricity generated in the case where the first substrate 101 vibrates in the direction of the X-axis and the amount of electricity generated in the case where the first substrate 101 vibrates in the direction perpendicular to the direction of the X-axis (in the direction of the Y-axis) are the same.

For ease of explanation, it is assumed that the dimensions in the direction of the X-axis and the direction of the Y-axis of the electrode regions contributing to electrical generation are the same in the two substrates (that is, the shapes of the entire electrodes in which the conductor parts are arranged in a checkerboard pattern are approximate square), and induction of electric charges by the electret electrode is brought about only when the conductor parts of the two electrodes are at opposed positions. In the vibration power generator of the present embodiment, given that a value when the overlapping area between the electrodes is maximized (that is, when the conductor parts 104a of the first electrode 104 and the conductor parts 105a of the second electrode 105 are perfectly overlapped) is 100, and a value when the overlapping area between the electrodes is minimized (that is, when the conductor parts 104a of the first electrode 104 are overlapped with the lattices without the conductor parts 105a of the second electrode 105) is 0, the maximum value of the overlapping area is 100 and the minimum value of the overlapping area is 0 even when the first substrate 101 vibrates in any one of the direction of the X-axis and the direction of the Y-axis. In other words, in accordance with the vibration power generator of the present embodiment, it is possible to convert externally-applied vibrations in the two-axis directions into electric power without decreasing the electrical generating efficiency.

Figure 2:
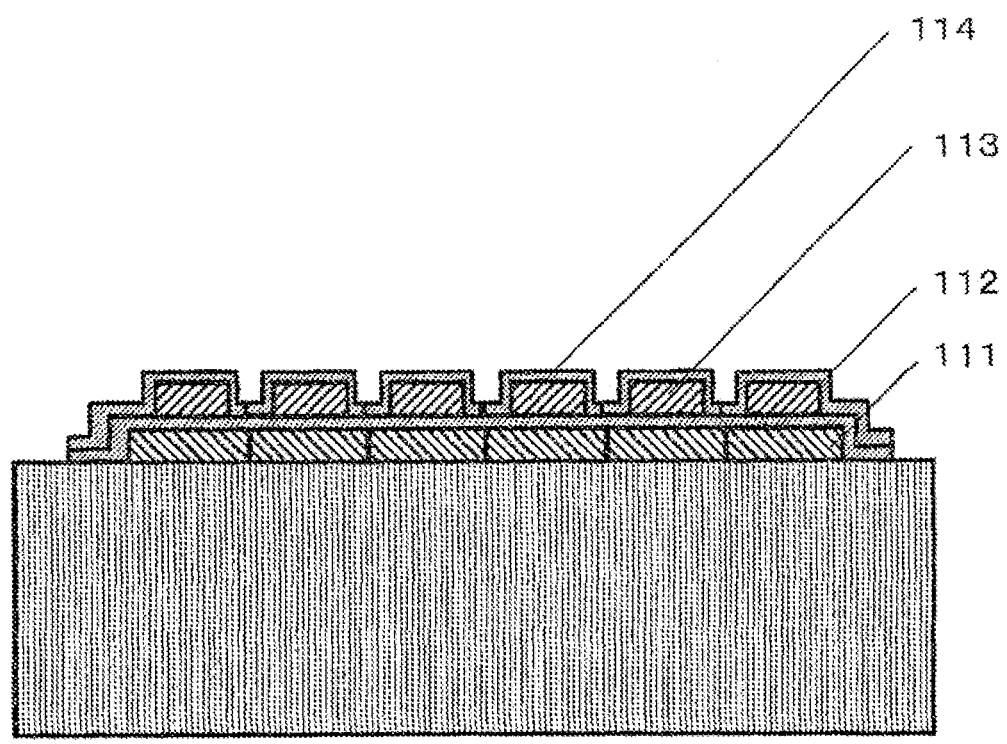
FIG. 2 is a cross-sectional view showing a first electrode structure taken along the line A-A in the vibration power generator shown in FIG. 1.

Next, the effect of the above-described (2) will be described with reference to FIG. 2. In the first electrode 104, for example, the film-type conductive parts (conductor parts) 111 (corresponding to 104a in FIG. 1) are arranged in a checkerboard pattern on the substrate, and since the conductive parts 111 arranged in a checkerboard pattern as shown in FIG. 2 have contact in their four corners with other conducive parts 111, those are electrically connected to one another. Alternately, in the case where the conductive parts do not have contact in their four corners with each other as shown in FIG. 1(b), the conductive parts may be connected to one another via thin conductor parts (wiring electrodes). A silicon nitride film 112, a silicon dioxide film 113, and a silicon nitride film 114 are laminated to be disposed on the conductive parts 111. It is preferable that the silicon dioxide film 113 serving as an electret is entirely covered with the silicon nitride film 113 such that the silicon nitride film 112 is formed in advance of the formation of the silicon dioxide film 113 and the silicon nitride film 114 is formed after the formation of the silicon dioxide film 113. Thereby, the humidity resistance of the silicon dioxide film is improved, which prevents leakage of the electric charges charged in the electret.

A film merely formed of one of the above-described materials does not function as an electret. In order for a film to function as an electret, after a film is formed of a material for an electret, a process of injecting electric charges into the film (charge injection) is required. In charge injection, provided that the conductive parts are formed so as to have a common electric potential, it is possible to obtain a preferable device characteristic.

Although not shown in FIG. 2, the silicon nitride films 112 and 114 are formed such that the conductive parts 111 are allowed to be electrically connected to an external terminal. At least, as long as the silicon nitride films 112 and 114 are formed so as to cover the silicon dioxide film 113, there is no need to form the films on the entire surface of the substrate, and those may be formed so as to expose a part of the conductive parts.

The silicon dioxide film (electret) 112 is formed in a checkerboard pattern in the same way as the conductive parts 111, and formed so as to cover the part of the conductive parts 111 as illustrated (i.e., so as to have an area smaller than the conductive parts 111 when viewed from the top). It is desirable to form an electret in such a way in view of the stability of the processes and the device characteristics.

Figure 3:
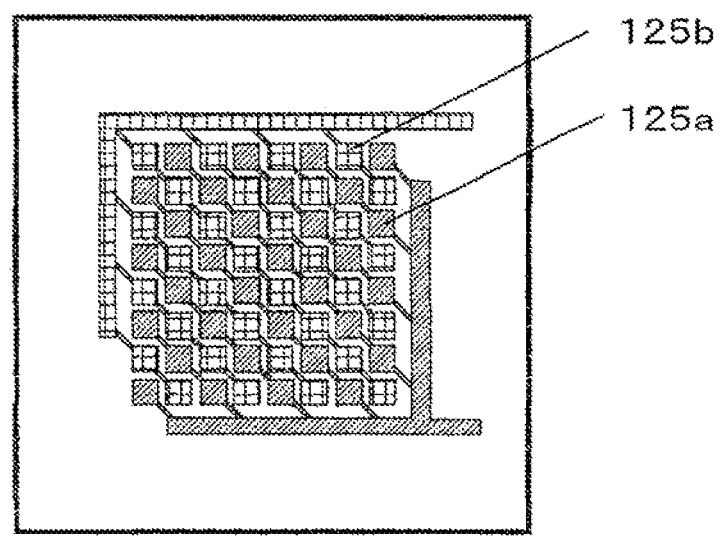
FIG. 3 is a top view showing another electrode structure in the vibration power generator according to the first embodiment of the present invention.

In FIG. 1, the second electrode whose conductive parts (conductor parts) are arranged in a checkerboard pattern is disposed as a set on the substrate. In a variation, two sets of second electrodes may be disposed as shown in FIG. 3. In FIG. 3, reference numeral 125a denotes an electrode group A, and reference numeral 125b denotes an electrode group B. The both electrode groups A and B have a configuration in which conductive parts are arranged in a checkerboard pattern, and the conductive parts of the electrode group A125a are arranged on lattices on which the conductive parts of the electrode group B125b are not located. Therefore, as illustrated, the area covered with the conductive parts on the second substrate is about twice the area in the aspect shown in FIG. 1.

When the two electrode groups are disposed in this way, electric power whose voltage phase is different by 180 degrees from the voltage phase of electric power output from the electrode group B125b is output from the electrode group A125a. Further, when the respective electrode terminals of the electrode group A125a and the electrode group B125b are connected to a full-wave rectifier circuit, it is possible to acquire a DC voltage twice the voltage in the case where one electrode group is used.

Further, when outputs from the respective electrode groups are put together on the circuit after DC conversion thereof, it is possible to extract electric charges twice the previous electric charges. In this way, when the second electrode is formed of a plurality of electrode groups, a considerable utilization effect is brought about.

In the embodiment shown in FIG. 1, the second electrode is formed such that a circumscribed area of the region on which the second electrode is formed is substantially the same as that of the first electrode. Here, "the circumscribed area of the region on which the second electrode is formed" is, i.e., an area which is a rectangle or a square including all the conductor parts composing the second electrode which has a minimum area when viewed from the top. In other words, the outline shape of the entire second electrode and the number of the conductor parts composing the second electrode are the same as those of the first electrode.

Figure 4:
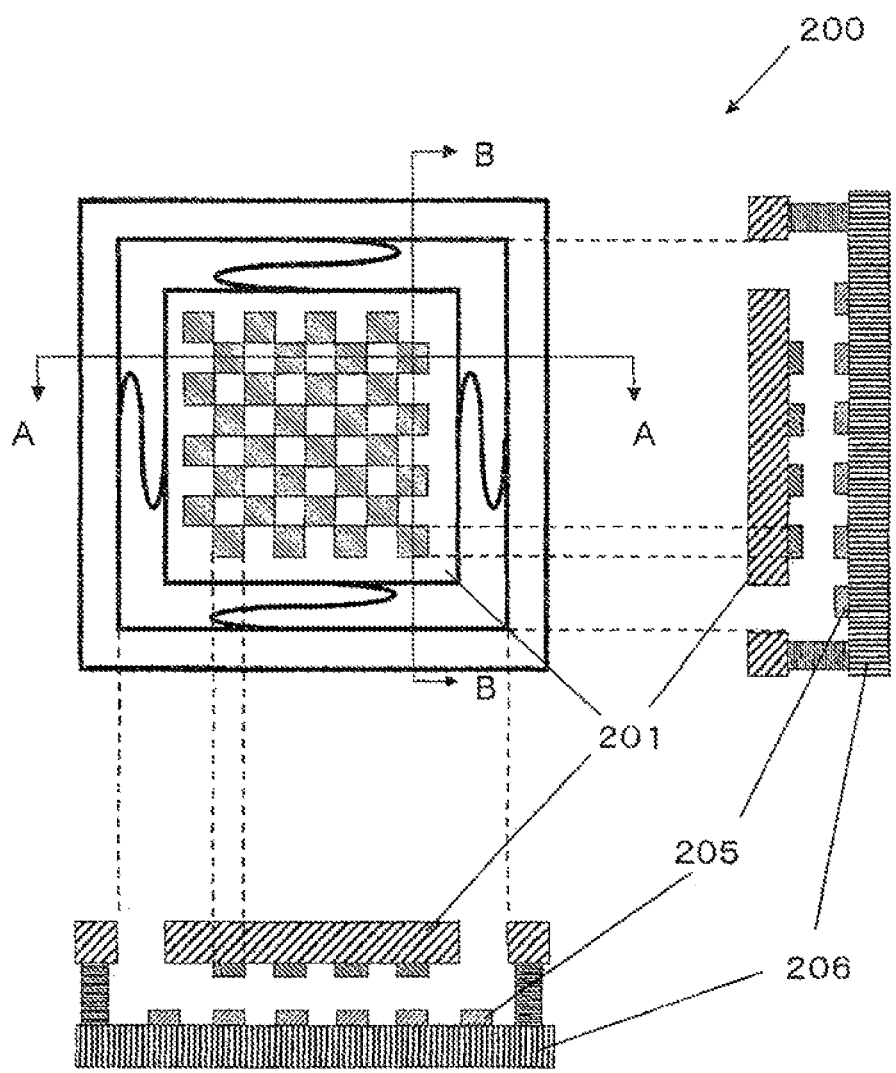
FIG. 4 is a view for explanation of a relationship between the first electrode and the second electrode in the vibration power generator according to the first embodiment of the present invention.

In a preferable variation of the embodiment shown in FIG. 1, a circumscribed area of the region on which the second electrode is formed is larger than a circumscribed area of the region on which the first electrode is formed. Such a variation is shown in FIG. 4. As shown in FIG. 4, it is desirable that a second electrode 206 is formed on a region greater than the region on which the first electrode is formed, on a second substrate 205. It is most preferable that a circumscribed area of the region on which the second electrode is formed stretches to the vibration limit of a first substrate 201.

With such a configuration, it is possible to obtain the following effect.

(3) It is possible to uniform effective region in overlapping area.

In the case where the first substrate vibrates with a high amplitude, when the electrode configuration shown in FIG. 1 is adopted, the electrodes is not overlapped in the region on which the second electrode is not formed, which causes the problem that the effective region of the overlapping area is decreased. Meanwhile, as shown in FIG. 4, it is possible to always uniform the effective region of the overlapping area by making a circumscribed area of the region on which the second electrode is formed larger than a circumscribed area of the region on which the first electrode is formed. As a result, it is possible to maintain the maximum value of 100 and the minimum value of 0 of the overlapping area described above.

The configuration as shown in FIG. 4 is effective for, not only the embodiment having the first substrate capable of vibrating in the direction of the X-axis and the direction of the Y-axis, but also a vibration power generator in which the first substrate is capable of vibrating only in a single-axial direction. In particular, this configuration is effective for the case where the elastic structure(s) has small spring constants to be significantly deformed by a slight force. Further, this configuration is effective for a vibration power generator in which the first substrate vibrates in the first-axial direction and/or the second-axial direction so as to be displaced greater than the dimension of a conductive part in the vibrating direction. Therefore, this configuration may be applied to the vibrating generator described in the aforementioned Patent documents 1 and 2.

In the present embodiment, the aspect in which the electrodes including the film-type electrets (electrets films) are formed on the first substrate is shown. It goes without saying that it is possible to obtain the same effect even when the electrodes including the film-type electret are formed on the second substrate. Further, regardless of the presence or absence of the electret, the second substrate may be connected to a fixation structure through elastic structures. In that case, it is preferable that the two electrodes are formed such that a circumscribed area of the region on which the first electrode is formed is larger than a circumscribed area of the region on which the second electrode is formed.

Figure 5:
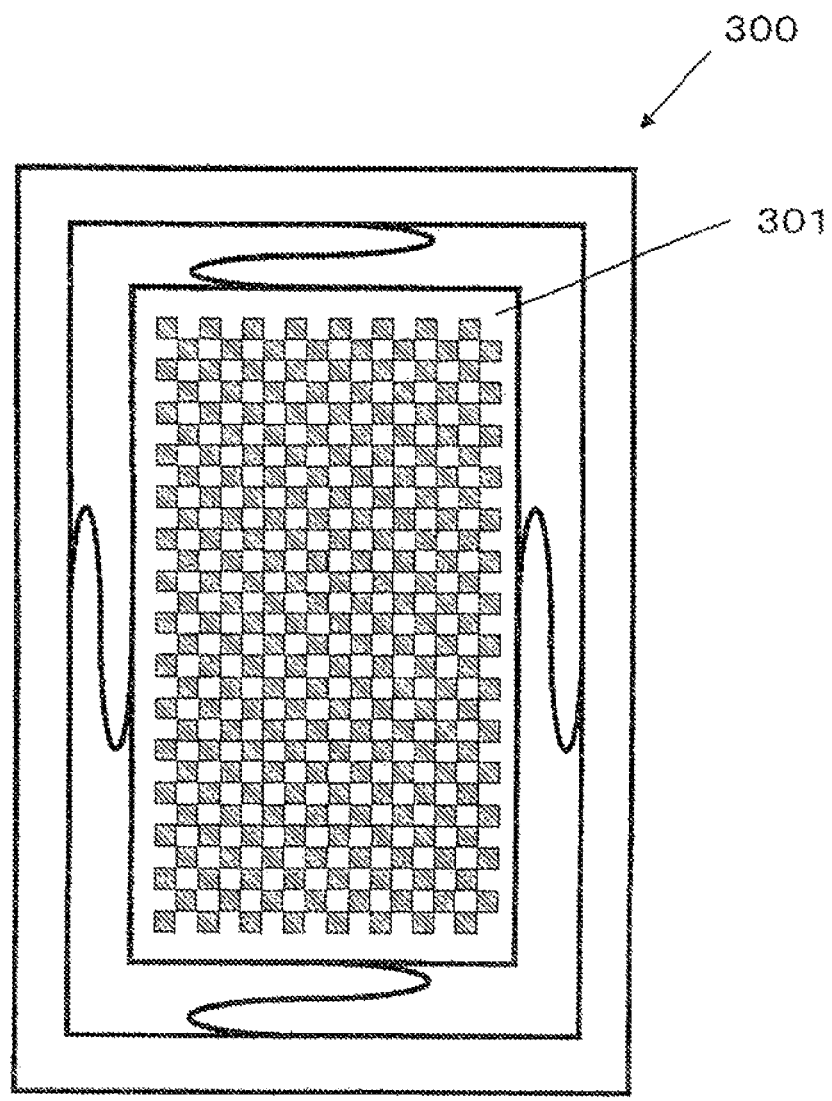
FIG. 5 is a top view showing another structure of the vibration power generator according to the first embodiment of the present invention.

Moreover, as a vibration power generator 300 shown in FIG. 5, the first substrate 301 may be a rectangle (an oblong figure). In that case, is preferable that the second substrate as well is a rectangle in the same way. Or, as long as the conductive parts are arranged in a checkerboard pattern, the first substrate may be another shape, and it goes without saying that it is possible to obtain the same effect of the present embodiment in that case as well.

In addition, in the present embodiment, the example in which the silicon dioxide film is served as the electret is shown. A silicon dioxide film is allowed to be positively-charged and negatively-charged. Therefore, as shown in FIG. 2, two sets of the first electrodes are arranged, and the electret belonging to the one electrode group is positively-charged and the electret belonging to the other electrode group is negatively-charged, thereby it is possible to further improve electric power output by vibrations, which is useful.

Further, the conductive parts may be not a square, but a rectangle. In that case, in order to acquire the same amount of electricity generated in the direction of the X-axis and the direction of the Y-axis, vibration amplitudes in the direction of the X-axis and the direction of the Y-axis of the first substrate (or the second substrate) are selected such that the maximum value of the overlapping area is 100 and the minimum value of the overlapping area is 0 according to a length of the long side or the short side of the rectangle.

The vibration power generator of the present invention may be configured such that the conductive parts of geometric figures respectively having a constant width (for example, a rhomboid shape and a parallelogram) are arranged in a checkerboard pattern in a single-axial direction (axial direction α) and an axial direction different from the axial direction α (axial direction β) in the first and second electrodes. In that case, the first substrate or the second substrate is connected to a fixation structure by use of elastic structures so as to be capable of vibrating in the axial directions α and β.

Second Embodiment

Figure 6:
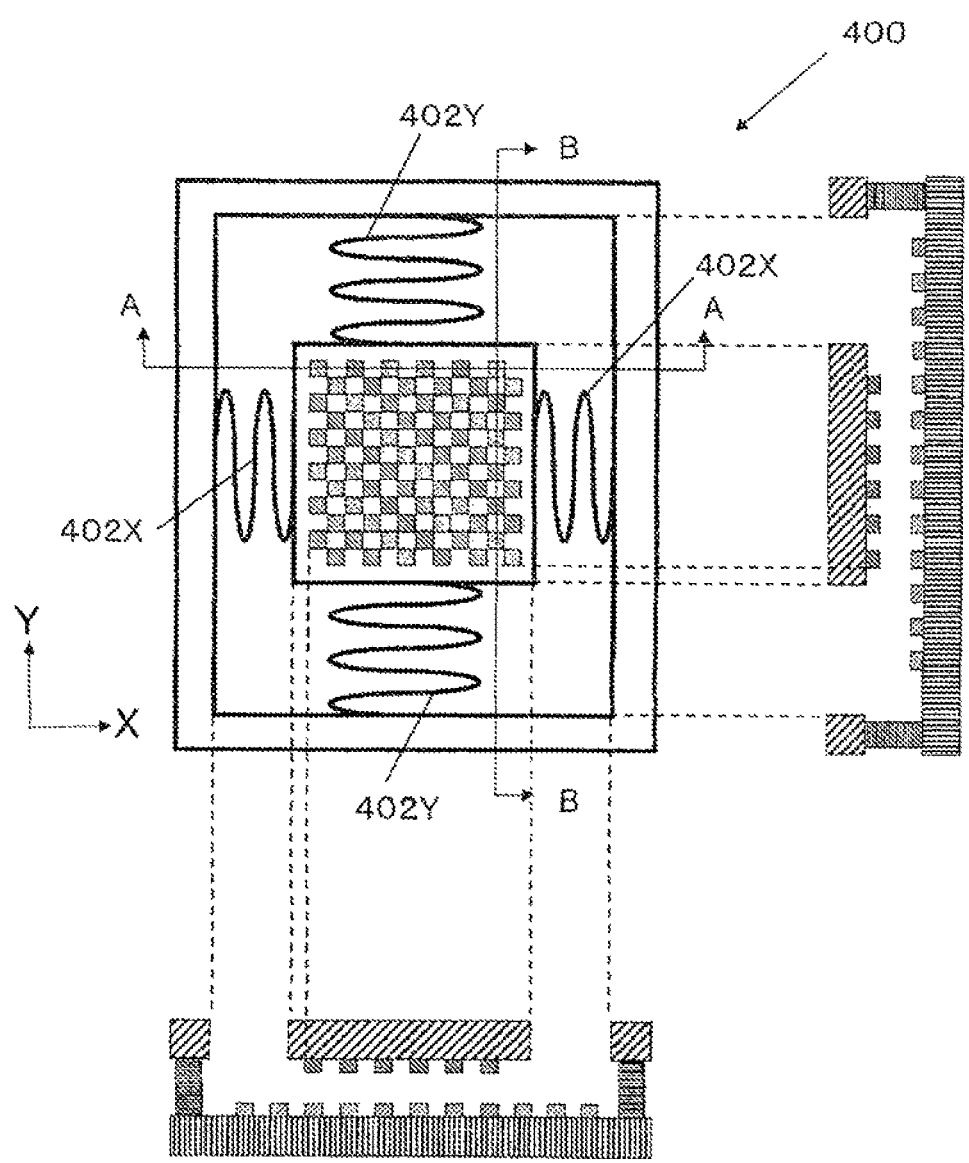
FIG. 6 is a view of a vibration power generator according to a second embodiment of the present invention.

FIG. 6 shows a top view of a vibration power generator 400 according to a second embodiment of the present invention, a cross-sectional view taken along the line A-A, and a cross-sectional view taken along the line B-B. The present embodiment is different from the first embodiment in the point that a spring constant in the direction of the X-axis of an elastic structures 402 that causes the first substrate to vibrate in the direction of the X-axis is different from a spring constant in the direction of the Y-axis of an elastic structure 402Y that causes the first substrate to vibrate in the direction of the Y-axis. In order to conceptually show a difference between the spring constants, the illustration is made such that the number of springs as the elastic structure 402X is different from the number of springs as the elastic structure 402Y. The elastic structure(s) is not necessarily springs, and may be formed of an elastomer material, or may be formed by processing onto a semiconductor substrate as described above.

The operation of a vibration power generator in which, as in the present embodiment, a spring constant kX of the elastic structure handling vibration in the direction of the X-axis is different from a spring constant kY of the elastic structure handling vibration in the direction of the Y-axis, will be hereinafter described.

The vibration power generator 400 performs electrical generation such that the first substrate receives an externally-applied force or vibration, to vibrate to be displaced with respect to the second substrate, and the second electrode detects a change of electric charges as a result of the displacement. At that time, the first substrate vibrates with particularly high amplitude with response to an external vibration at a resonant frequency determined by the first substrate and the elastic structures. Provided that the spring constants of the elastic structures 402X and 402Y made different from each other, the resonant frequencies in the direction of the X-axis and the direction of the Y-axis of the vibration power generator 400 become different values. As a result, for example, even in the case where a vibration at a certain frequency is externally applied in an oblique direction (a direction at an angle other than 90 degrees to the X-axis), it is possible to forcibly cause the first substrate to vibrate in one of the direction of the X-axis and the direction of the Y-axis.

Accordingly, the configuration in the embodiment shown in FIG. 4 brings about the following effect.

(4) Decrease in amount of electricity generated is prevented, to enlarge the available range of the vibration power generator.

The effect of the above-described (4) will be described. As the operation of the vibration power generator of the present embodiment described above, provided that a spring constant in the direction of the X-axis of the elastic structure 402X is made different from a spring constant in the direction of the Y-axis of the elastic structure 402Y, it is possible to make the resonant frequencies in the direction of the X-axis and the direction of the Y-axis different from each other. In the vibration power generator, the first substrate vibrates by an externally-applied force or vibration to generate electricity. Therefore, when the resonant frequencies are different from each other, the vibration power generator is forcibly excited in one of the directions responding to vibrations at a same frequency. As a result, in the case where the electrode configuration in which the conductive parts are arranged in a checkerboard pattern is adopted, even when a force displacing the first substrate in an oblique direction is externally applied, the amount of electricity generated is not extremely decreased in any case. This enables to reduce decrease in amount of electricity generated in a region at a specific frequency or a region other than an externally-applied vibration in a specific direction; thereby it is possible to enlarge the available range.

In the present embodiment as well, a circumscribed area of the region on which the second electrode is formed is larger than a circumscribed area of the region on which the first electrode is formed, and the second electrode is formed to its vibration limit. Due to the electrodes being configured in this way, the vibration power generator in this embodiment is capable of operating without decreasing the amount of electricity generated even when the first substrate vibrates with high amplitude.

The technology implication on that a spring constant kX in the direction of the X-axis of the elastic structure(s) 402X causing the first substrate to vibrate in the direction of the X-axis and a spring constant kY in the direction of the Y-axis of the elastic structure(s) 402Y causing the first substrate to vibrate in the direction of the Y-axis are different from each other, will be hereinafter described in more detail.

Figure 7:
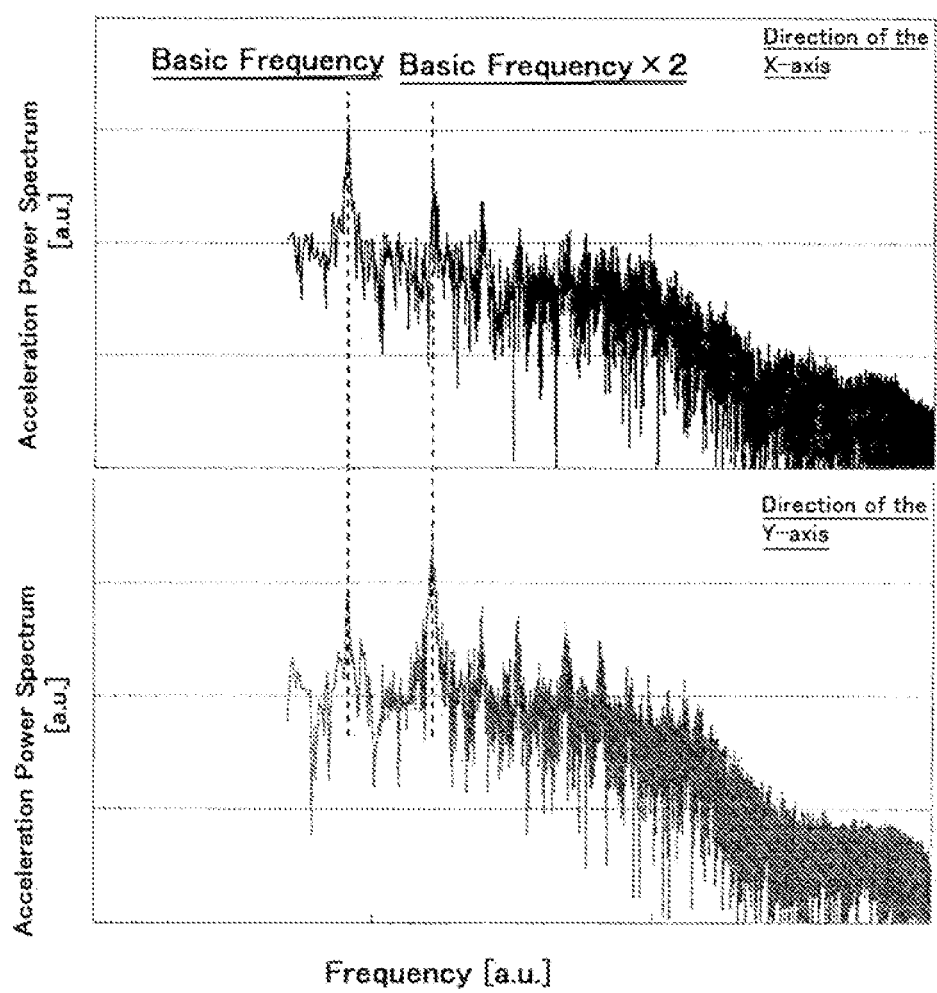
FIG. 7 is a graph showing examples of measurement results of acceleration power spectrums of vibrations generated from walking

FIG. 7 is a graph showing a measurement example of an acceleration power spectrum of a vibration in the direction of the X-axis and an acceleration power spectrum of a vibration in the direction of the Y-axis which is generated from walking under a predetermined condition. As shown in the graph, the upper spectrum corresponds to the vibration in the direction of the X-axis, and the lower spectrum corresponds to the vibration in the direction of the Y-axis. The abscissa axis of the graph plots frequencies denoted in arbitrary units, the ordinate axis plots power spectrums denoted in arbitrary units, and the abscissa axis and the ordinate axis are logarithmically displayed.

The vibration in the direction of the X-axis has a peak maximum of the acceleration power spectrum at a frequency denoted by "basic frequency" in FIG. 7, and on the other hand, the vibration in the direction of the Y-axis has a peak maximum of the acceleration power spectrum at a frequency twice the basic frequency shown by "basic frequency×2" in the graph. That is, the frequencies at which the acceleration power spectrums are maximized are different in the direction of the X-axis and the direction of the Y-axis.

Meanwhile, the vibration in the direction of the Y-axis as well has a high peak of the power spectrum at the basic frequency at which the acceleration power spectrum of the vibration in the direction of the X-axis is maximized. Further, the vibration in the direction of the X-axis as well has a high peak of the power spectrum at the frequency twice the basic frequency at which the acceleration power spectrum of the vibration in the direction of the Y-axis is maximized.

Table 1 shows the levels of the acceleration power spectrums at the basic frequency and the frequency twice the basic frequency ("basic frequencies×2" in FIG. 7) respectively in the direction of the X-axis and the direction of the Y-axis in the case where the acceleration power spectrum at the basic frequency of the vibration in the direction of the X-axis is set to 100.

TABLE 1

| | Acceleration Power Spectrum | |
| --- | --- | --- |
| | Direction of the X-axis | Direction of the Y-axis |
| Basic Frequency | 100 | 57 |
| Basic Frequency × 2 | 20 | 892 |

These results show the fact that, when a spring constant kX of the elastic structure 402X and a spring constant kY of the elastic structure 402Y are set such that a resonance is generated at the frequency twice the basic frequency at which the acceleration power spectrum of the vibration in the direction of the Y-axis is maximized, the first substrate is resonated in the both directions of the X-axis and the Y-axis, that is against the object to improve the electrical generating efficiency by causing the first substrate to vibrate in one of the direction of the X-axis and the direction of the Y-axis, that is the feature of the present invention, and the electrical generating efficiency is decreased in some cases.

Similarly, even when a spring constant kX of the elastic structure 402X and a spring constant kY of the elastic structure 402Y are set such that a resonance is generated at the basic frequency at which the acceleration power spectrum of the vibration in the direction of the X-axis is maximized, the first substrate is resonated in the both directions of the X-axis and the Y-axis, which decreases the electrical generating efficiency.

It is shown from the graph of FIG. 7 that half bandwidths of the high peaks of the acceleration power spectrums at the basic frequency and the frequency twice the basic frequency in the direction of the X-axis and the direction of the Y-axis are within about 30% of their high peak frequencies, respectively. Accordingly, provided that a spring constant kX of the elastic structure 402X and a spring constant kY of the elastic structure 402Y are set such that a resonant frequency in the other direction is separated by ±15% or more from a resonant frequency in one of the direction of the X-axis and the direction of the Y-axis, it is possible to generate a resonance only in one of the direction of the X-axis and the direction of the Y-axis, which makes it possible to significantly improve the electrical generating efficiency.

It is more preferable that a spring constant kX of the elastic structure 402X and a spring constant kY of the elastic structure 402Y are set such that a resonant frequency in the other direction is separated by ±20% or more from a resonant frequency in one of the direction of the X-axis and the direction of the Y-axis, so as to limit generation of a resonance in one of the direction of the X-axis and the direction of the Y-axis. In more detail, the setting is carried out such that a resonant frequency in the other direction is separated ±15% or more from a frequency constant-times as high as one resonant frequency of the vibrations in the direction of the X-axis and the direction of the Y-axis, or separated by ±20% or more from the one resonant frequency so as to more securely limit to one of the direction of the X-axis and the direction of the Y-axis.

In addition, it is clear that the setting of a spring constant kX of the elastic structure(s) causing a vibration in the direction of the X-axis and a spring constant kY of the elastic structure(s) causing a vibration in the direction of the Y-axis such that a resonant frequency in the other direction is separated by ±15% or more, or ±20% or more from a resonant frequency in one of the direction of the X-axis and the direction of the Y-axis, may be applied to all the vibration power generators shown in the first embodiment.

Third Embodiment

Figure 8:
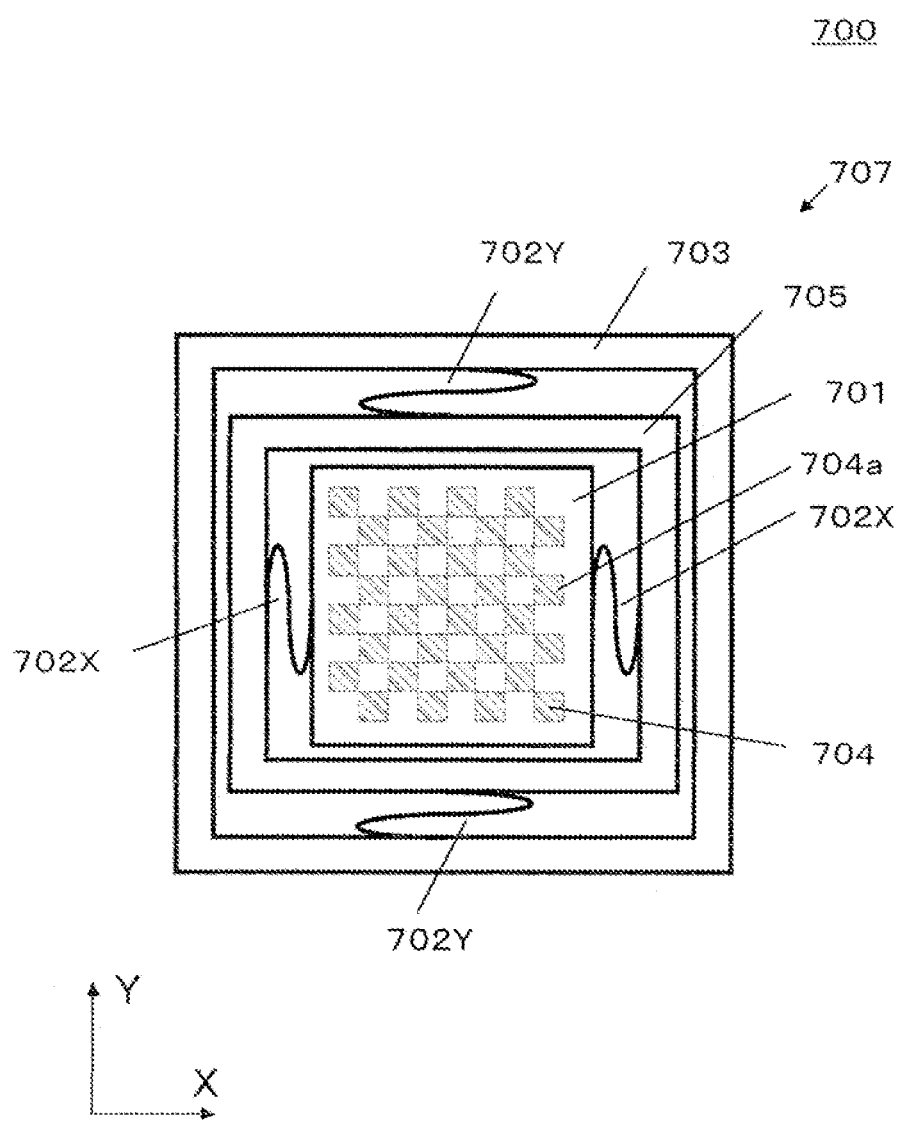
FIG. 8 is a view of a vibration power generator according to a third embodiment of the present invention.

FIG. 8 is a top view of a first structure 707 of a vibration power generator 700 according to a third embodiment of the present invention.

Similarly to FIG. 1, in FIG. 8 as well, a first electrode 704 formed on the first structure 707 is shown for easy understanding. In the actual vibration power generator, the first electrode 704 is disposed on the bottom surface of the first substrate to face a second electrode, and those are therefore not shown in appearance.

In FIG. 8, the description of the second structure used for the vibration power generator 700 is omitted. As the second structure of the vibration power generator 700, for example, any one of the second structures shown in the present specification including a structure with the same configuration of the second structure 108 of the vibration power generator 100 shown in FIG. 1 may be used.

The present embodiment is different from the first embodiment in the point that a variable structure 705 is provided between a fixation structure 703 and a first substrate 701. The variable structure 705 is connected to the fixation structure 703 substantially parallel to the Y axis via elastic structure 702Y contributing to a vibration in the direction of the Y-axis, and is connected to the first substrate 701 substantially parallel to the X axis via elastic structure 702X contributing to a vibration in the direction of the X-axis.

With such a configuration, the vibration power generator 700 is capable of making a resonant frequency in the direction of the X-axis and a resonant frequency in the direction of the Y-axis different from each other even in the case where spring constants of the elastic structure 702X and the elastic structure 702Y are the same, and is therefore capable of performing electrical generation at a high efficiency.

That is, in the case of causing a vibration in the direction of the X-axis, the elastic structure 702X causes the first substrate 701 to vibrate. On the other hand, in the case of causing a vibration in the direction of the Y-axis, the elastic structure 702Y causes, not only the first substrate 701, but also the elastic structure 702X and the variable structure 705 to vibrate. Accordingly, since the masses of objects to be caused to vibrate (the total masses) are different from each other even when the spring constants of the elastic structure 702X and the elastic structure 702Y are the same, it is possible to make a resonant frequency of the vibration in the direction of the X-axis and a resonant frequency of the vibration in the direction of the Y-axis different from each other.

When the vibration power generator 700 is structured in this way, it is possible to clearly limit (separate) a vibrating direction of the first substrate 701 (i.e., the first electrode 704) to one of the direction of the X-axis and the direction of the Y-axis.

In addition, it is preferable that the vibration power generator 700 is configured such that a resonant frequency in the other direction is separated by ±15% or more from a resonant frequency in one of the direction of the X-axis and the direction of the Y-axis by adjusting, for example, the spring constants of the elastic structures 702X and 702Y, the mass of the variable structure 705, or the like. It is more preferable that the vibration power generator 700 is configured such that a resonant frequency in the other direction is separated by ±20% or more from a resonant frequency in one of the direction of the X-axis and the direction of the Y-axis.

Further, the elastic structure 702X and the elastic structure 702Y may be structured in the same way and may be composed of the same material as the elastic structures 102X and 102Y of the first embodiment.

Moreover, the configurations shown in the first embodiment or the second embodiment may be used for the configurations, such as the arrangement of the electrodes, the connection between the first structure 707 and the second structure (for example, the second structure 108), the distance between the first electrode 704 and the second electrode (for example, the second electrode 105), the material composing the first substrate 701 and the second substrate (for example, the second substrate 106), and the first electrode 704, other than the above-described descriptions of the vibration power generator 700.

The spring constants of the elastic structure 702X and the elastic structure 702Y may be the same as described above, and may be different from each other in a configuration in which a resonant frequency in the other direction is separated by ±15% or more from a resonant frequency in one of the direction of the X-axis and the direction of the Y-axis.

The operation of the vibration power generator 700 configured as described above will be described.

When a force or a vibration is externally applied to the vibration power generator 700, the elastic structure 702X and/or the elastic structure 702Y expand and contract, thereby the first substrate 701 vibrates in the direction of the X-axis or the direction of the Y-axis, to be relatively displaced with respect to the second substrate (herein, the second substrate 106 is used as an example).

This relative displacement brings about increase and decrease of the overlapping area between conductor parts 704a of the first electrode 704 and conductor parts 105a of the second electrode 105. According to the increase and decrease of the overlapping area, the amount of electric charges induced by the second electrode 105 is increased or decreased. The increase and decrease of electric charges is extracted as electrical energy, to generate electric power. Further, as long as the first substrate 701 continues vibrating, the increase and decrease of the overlapping area is continued.

In accordance with the vibration power generator 700 according to the third embodiment, it is possible to obtain the following excellent effects as compared with the vibration power generator according to the first embodiment.

(1) It is possible to apply vibrations in the direction of the X-axis and the direction perpendicular to the X axis (Y-axis direction) separately to a vibrating body, so as to make the vibrating body less affected by a vibration in the other direction (or, the elastic structure).

(2) Since a vibration in one of the direction of the X-axis and the direction of the Y-axis is regulated in its displacement responding to a vibration in the other direction, the vibration power generator 700 is less affected by a vibration in the other direction at the time of converting vibration energy and electrical energy.

The effect of the above-described (1) will be described in more detail.

In the case where a vibration in the direction of the X-axis is externally applied, the vibration is transmitted to the variable structure 705 via the fixation structure 703 and the elastic structure 702Y. Meanwhile, since the elastic structure 702Y is structured to be elastically deformed forcibly in the direction of the Y-axis, the elastic structure 702Y is hardly elastically-deformed by a vibration externally applied, and the vibration externally applied is directly transmitted to the elastic structure 702X via the elastic structure 702Y and the variable structure 705. Then, the elastic structure 702X is vibrated (resonated depending on a frequency) to transmit the vibration to the first substrate 701. That is, the first substrate 701 vibrates without being affected by the elastic structure 702Y, thereby causing the vibration power generator 700 to operate as if a generator operating by a vibration only in the direction of the X-axis.

In contrast thereto, in the case where a vibration in the direction of the Y-axis is externally applied, the vibration is transmitted to the elastic structure 702Y via the fixation structure 703. Then, the elastic structure 702Y is vibrated (resonated depending on a frequency) to transmit the vibration to the variable substrate 705. Herein, since the elastic structure 702X is structured to be elastically-deformed forcibly in the direction of the X-axis, the vibration transmitted to the variable substrate 705 is directly transmitted to the first substrate 701 via the elastic structure 702X, and the variable substrate 705, the elastic structure 702X and the first substrate 701 vibrate so as to be integrated as if one substrate.

That is, due to the first substrate 701 vibrating without being affected by the elastic structure 702X, the vibration power generator 700 operates as a generator operating by a vibration only in the direction of the Y-axis.

In other words, the vibration power generator 700 of the present embodiment can be operated with separating more clearly a vibration in the direction of the X-axis and a vibration in the direction of the Y-axis as compared with the first vibrating generator of the first embodiment.

In addition, an example of an elastic structure which is forcibly deformed in one of the direction of the X-axis and the direction of the Y-axis in this way will be described later with reference to FIG. 10.

Next, the effect of the above-described (2) will be described.

As shown in FIG. 8, the fixation structure 703 and the variable structure 705 are disposed in the direction of the X-axis in a narrow space. Further, the variable structure 705 and the first substrate 701 are disposed in the direction of the Y-axis in a narrow space. With such disposition, it is possible to reduce a displacement of the vibration in the other direction even when a vibration in one of the direction of the X-axis and the direction of the Y-axis is affected by a vibration in the other direction, and to secure the overlapping amount of the electrodes, which makes it possible to prevent the electrical generating efficiency from being decreased.

Moreover, similar to the case as shown in the first embodiment (FIG. 5), the first substrate 701 may be a rectangle (an oblong figure). In that case, it is preferable that the second substrate as well is a rectangle in the same way. Alternately, as long as the conductive parts are arranged in a checkerboard pattern, the first substrate 701 may be another shape, and it goes without saying that it is possible to obtain the same effect of the present embodiment in that case as well.

In addition, in the present embodiment, it is preferable that the electret is used as a silicon dioxide film. A silicon dioxide film is allowed to be positively-charged and negatively-charged. Therefore, as shown in FIG. 2, two sets of the first electrodes 704 are arranged, and the electret belonging to one electrode group is positively-charged and the electret belonging to the other electrode group is negatively-charged, which makes it possible to further improve electric power output by vibrations.

Further, the conductor (conductive) parts may be not a square, but a rectangle. In that case, in order to acquire the same amount of electricity generated in the direction of the X-axis and the direction of the Y-axis, vibration amplitudes in the direction of the X-axis and the direction of the Y-axis of the first substrate (or the second substrate) are selected such that the maximum value of the overlapping area is 100 and the minimum value of the overlapping area is 0 according to a length of the long side or the short side of the rectangle.

In the embodiment shown in FIG. 8, the first substrate 701 having the electret is caused to vibrate, and the second substrate is fixed. Meanwhile, an embodiment as well in which the first substrate 701 having the electret is fixed to the fixation structure 703, and the second substrate (for example, the second substrate 106) is connected to the elastic structure 702 to be caused to vibrate, is included by necessity in the present embodiment.

Variation

Figure 9:
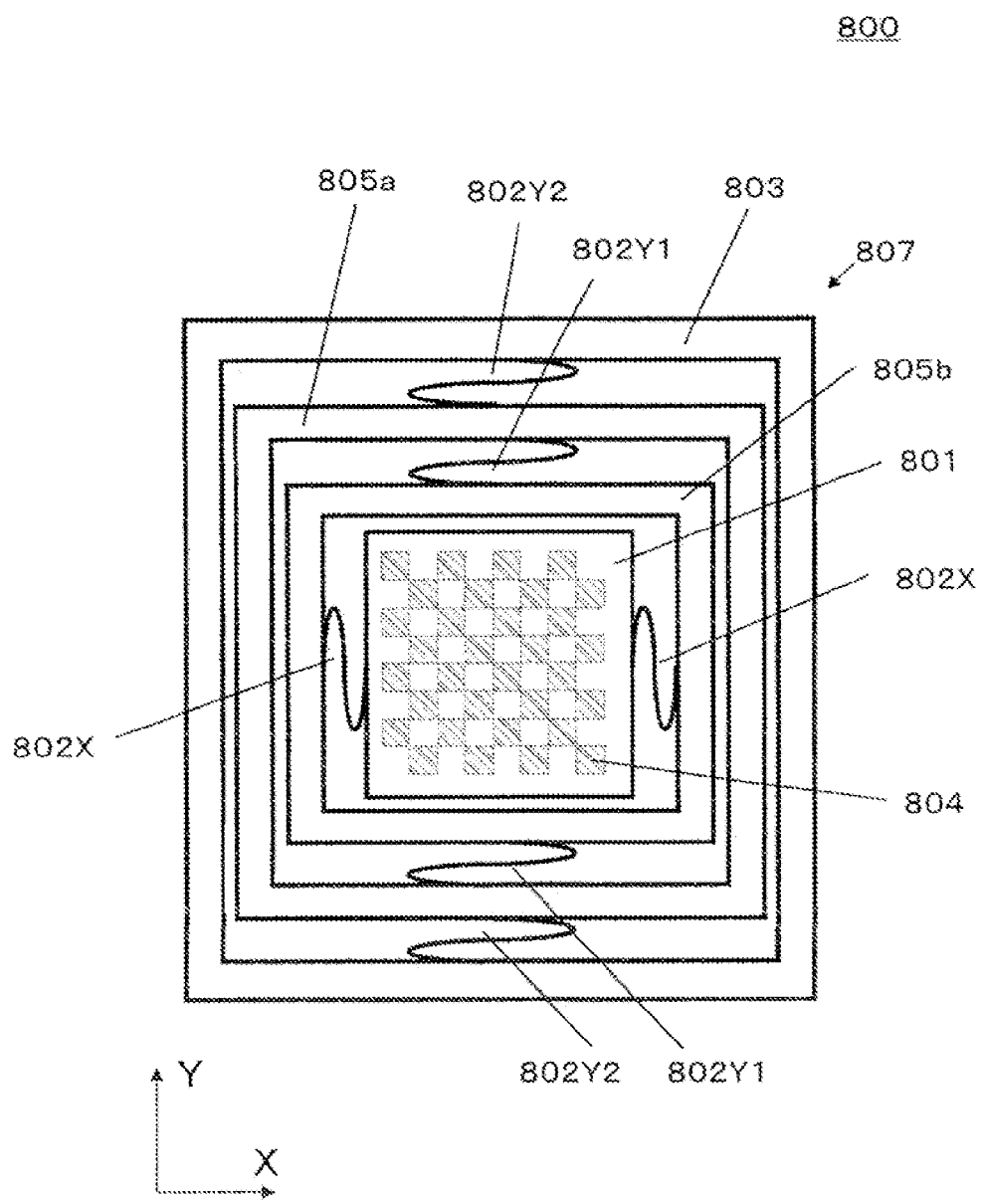
FIG. 9 is a view of a vibration power generator according to a variation of the third embodiment of the present invention.

FIG. 9 is a top view of a first structure 807 of a vibration power generator 800 that is a variation of the third embodiment of the present invention.

Similar to FIG. 8, in FIG. 9 as well, a first electrode 804 formed on the first substrate 807 is shown in order to facilitate understanding. In the actual vibration power generator 807, the first electrode 804 is disposed on the bottom surface of the first substrate to face a second electrode, and those are therefore not shown in appearance.

In FIG. 9, the description of the second structure used for the vibration power generator 800 is omitted. As the second structure of the vibration power generator 800, for example, any one of the various second structures shown in this specification including a structure with the same configuration of the second structure 108 of the vibration power generator 100 shown in FIG. 1 may be used.

The vibration power generator 800 is different from the vibration power generator 700 in the point that two variable structures which are a first variable structure 805a and a second variable structure 805b are provided between a fixation structure 803 and a first substrate 801.

The first variable structure 805a is connected to the fixation structure 803 substantially parallel to the Y axis via an elastic structure 802Y2 contributing to a vibration in the direction of the Y-axis, and is connected to the second variable structure 805b substantially parallel to the Y axis via another elastic structure 802Y1 contributing to a vibration in the direction of the Y-axis.

The second variable structure 805b is connected to the medially-located first substrate 801 substantially parallel to the X axis via an elastic structure 802X contributing to a vibration in the direction of the X-axis.

The other configurations of the vibration power generator 800 including the first substrate 801 and the first electrode 804 other than the above-described configurations may be the same as the vibration power generator 700.

The vibration power generator 800 has the advantage that it is possible to increase the number of frequencies at which a resonance is generated in a vibration in the direction of the Y-axis in addition to the advantage provided to the vibration power generator 700.

The two elastic structures which are the elastic structure 802Y1 and the elastic structure 802Y2 contribute to a vibration in the direction of the Y-axis.

Therefore, it is possible for a vibration in the direction of the Y-axis to have two different resonant frequencies.

This is because, a mass point formed by the first substrate 801, the elastic structure 802X and the variable structure 805b with respect to the direction of the Y-axis and a mass point formed by the variable structure 805a are connected with the elastic structures 802Y1 and 802Y2, to allow the two mass points to independently vibrate.

Having two different frequencies in the direction of the Y-axis means that a resonance in the direction of the Y-axis is generated in a broader frequency band responding to the externally-applied vibration when a vibration is externally applied to the vibration power generator 800. Accordingly, it is possible to perform electrical generation in a broader frequency band responding to an externally-applied vibration.

With respect to the two resonant frequencies in the direction of the Y-axis, it is preferable that resonant frequencies are matched to the two frequencies which are the basic frequency and the frequency twice the basic frequency by adjusting the spring constants of the elastic structures 802Y1 and 802Y2 or the masses of the variable structures 805a and 805b on the basis of, for example, the example of walking in FIG. 7. With such setting, it is possible to greatly displace the first substrate 801, and it is possible to output more electric power from the vibration power generator 800.

Further, on the basis of the example of vibration in walking in FIG. 7, it is possible to set a resonant frequency determined by masses of the first substrate 801, the elastic structure 802X and the variable structure 805b, and a spring constant of the elastic structure 802Y1, and a resonant frequency determined by masses of the first substrate 801, the elastic structures 802X and 802Y1 and the variable structures 805b and 805b, and a spring constant of the elastic structure 802Y2 to be different from each other by adjusting spring constants of the elastic structures 802Y1 and 802Y2 or masses of the variable structures 805a and 805b. With such setting, it is possible to displace the first substrate 801 responding to multiple externally-applied vibrations, and it is possible to output electric power in a broader frequency band from the vibration power generator 800.

In addition, for example, the elastic structures arranged in the direction of the X-axis may be arranged such that the number of variable structures is increased to have two or more resonant frequencies of a vibration in the direction of the X-axis. Further, for example, the numbers of variable structures and elastic structures may be increased to have three or more resonant frequencies of a vibration in the direction of the Y-axis.

Figure 10:
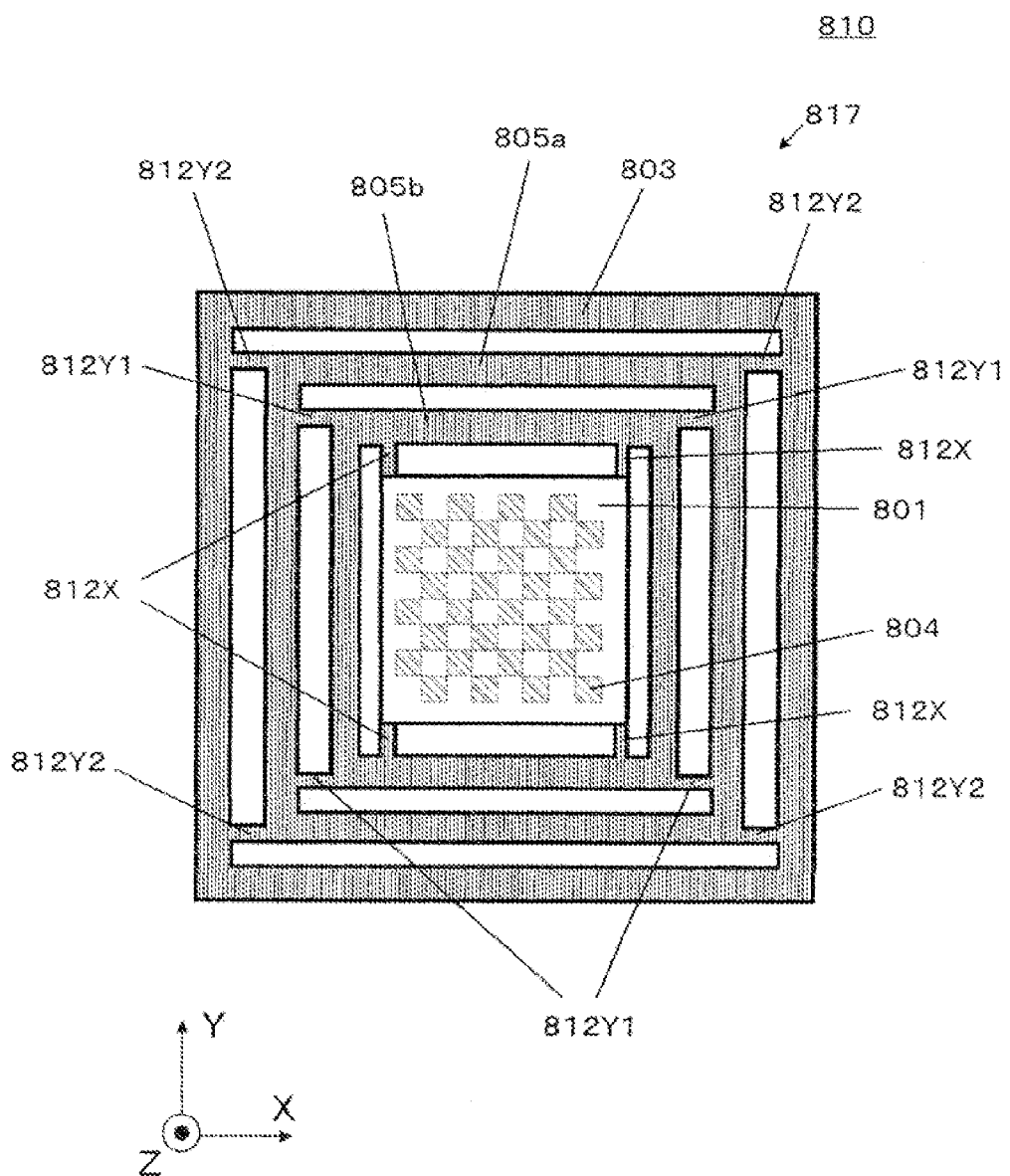
FIG. 10 is a view of a vibration power generator according to a variation of the third embodiment of the present invention, which includes a specific example of elastic structure(s).

FIG. 10 is a top view of a first structure 817 of a vibration power generator 810 including a specific example of elastic structure which is elastically-deformed only in one direction of the direction of the X-axis and the direction of the Y-axis.

The vibration power generator 810 has the same configuration as the vibration power generator 800 shown in FIG. 9, and members having the same configurations thereof are denoted by the same numbers in FIG. 9.

Further, in order to easily recognize the arrangement of the elastic structures which will be hereinafter described in detail, in FIG. 10, the fixation structure 803, the first variable structure 805a, the second variable structure 805b and the elastic structures 812X, 812Y1 and 812Y2 are denoted by hatchings.

The elastic structure 812X has an elongate beam structure extending in the direction of the Y-axis (which are disposed at four places in the example of FIG. 10), and the elastic structure 812Y1 and the elastic structure 812Y2 have an elongate beam structure extending in the direction of the X-axis (in the example of FIG. 10, the elastic structure 812Y1 and the elastic structure 812Y2 are respectively disposed at four places).

The elastic structure 812X is allowed to be elastically-deformed in the direction of the X-axis due to such a beam structure being deflected (bent), but hardly elastically-deformed in the direction of the Y-axis. In the same way, the elastic structure 812Y1 and the elastic structure 812Y2 are allowed to be elastically-deformed in the direction of the Y-axis, but hardly elastically-deformed in the direction of the X-axis. Further, the elastic structures 812X, 812Y1 and 812Y2 are capable of being elastically-deformed less in the direction of the Z-axis in such ways that, for example, the thickness of the beam (width in the direction of the Z-axis) is made sufficiently thicker than the width of the beams in the direction of the X-axis (relative to 812X) or in the direction of the Y-axis (relative to 812Y1 and 812Y2).

Fourth Embodiment

Figure 11:
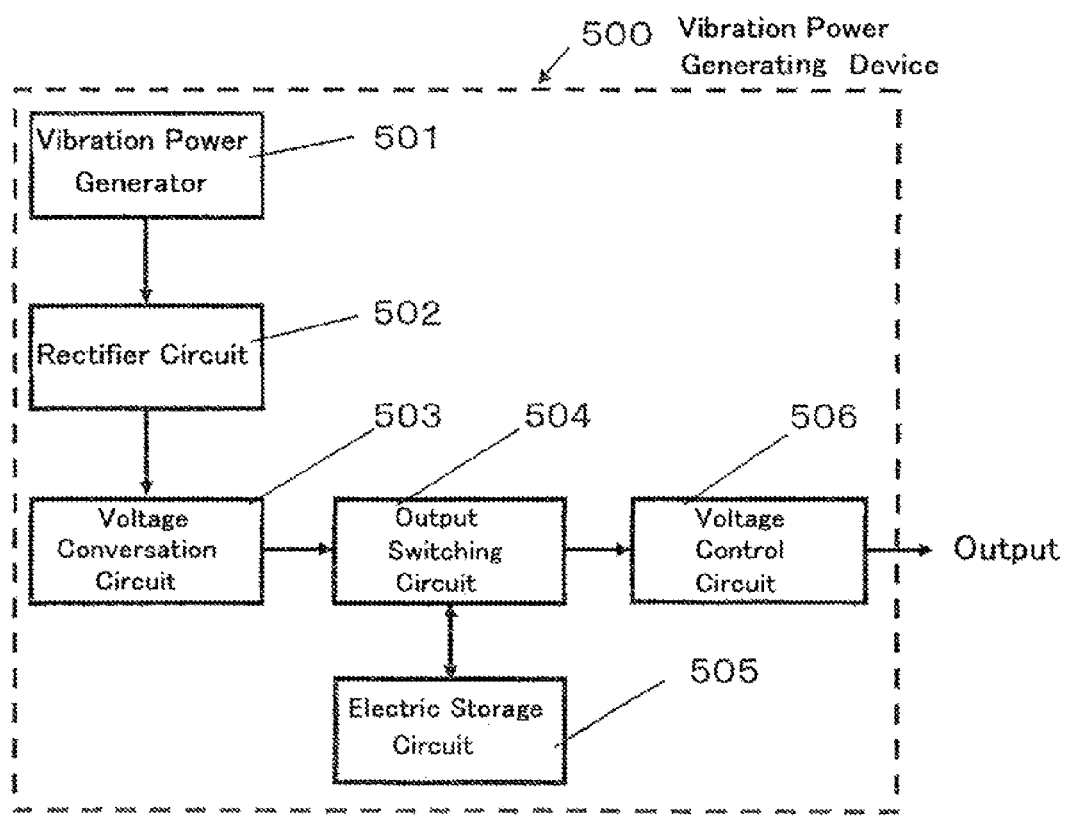
FIG. 11 is a block diagram showing a vibration power generating device according to the third embodiment of the present invention.

As a third embodiment of the present invention, a vibration power generating device will be described. FIG. 11 is a block diagram of a vibration power generating device 500. In FIG. 11, the vibration power generator is a vibration power generator shown in any one of the first to third embodiments.

In FIG. 11, the vibration power generating device 500 includes a vibration power generator 501, a rectifier circuit 502, a voltage conversion circuit 503, an output switching circuit 504, an electric storage circuit 505 and a voltage control circuit 506. An AC voltage output from the vibration power generator 501 is converted into a DC voltage by the rectifier circuit 502. The DC voltage is input to the voltage conversion circuit 503 to be subjected to voltage conversion up to an output voltage level of the vibration power generating device 500. The converted voltage is input to the voltage control circuit 506 or the electric storage circuit 505 by the output switching circuit 504. In the voltage control circuit 506, the voltage is subjected to voltage control to have a constant output voltage to be output.

Figure 12:
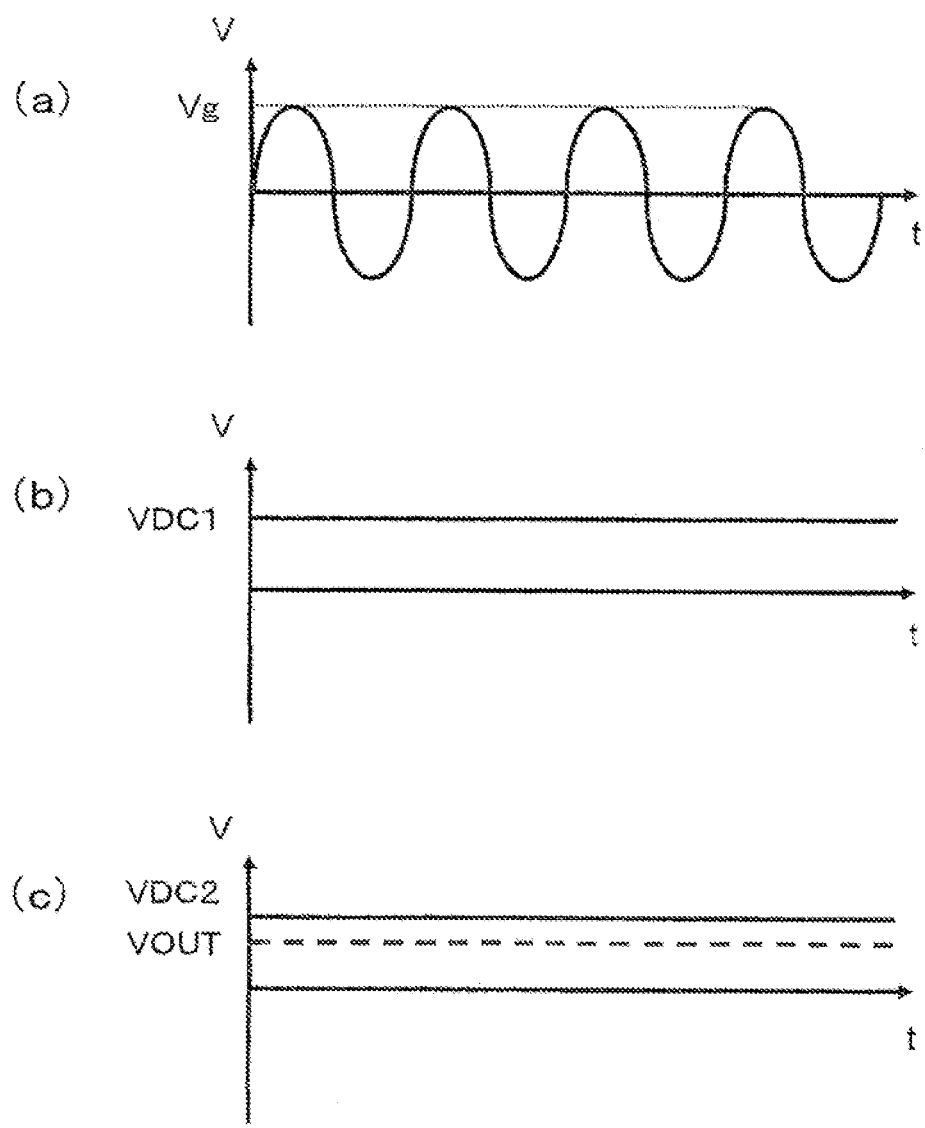
FIG. 12 is a graph showing the voltage waveforms of the respective units of the vibration power generating device according to the third embodiment of the present invention.

The operation of the vibration power generating device 500 configured as described above will be described with reference to FIG. 12. FIG. 12 show the voltage waveforms output from the respective circuits of the vibration power generating device 500. FIG. 12(a) is an output voltage waveform from the vibration power generator 501. In the present embodiment, for ease of explanation, it is assumed that electrical generation is efficiently performed even when the direction of displacement of the first substrate is changed, a sinusoidal voltage is output according to increase and decrease of an overlapping area by a vibration. Here, a voltage amplitude Vg of an output voltage from the vibration power generator 501 differs according to a vibration amplitude of the first substrate, a gap between the first substrate and the second substrate, an amount of electric charges retained by the electret and a magnitude of an external impedance viewed from the vibration power generator 501. An AC voltage output from the vibration power generator 501 is converted into a DC voltage VDC1 by the rectifier circuit 502 (FIG. 12(b)). The VDC1 is subjected to voltage conversion up to an output voltage level VDC2 of the vibration power generating device 500 by the voltage conversion circuit 503.

When there is no need to output a voltage from the vibration power generating device 500, the output switching circuit 504 functions, not to transmit an output from the voltage conversion circuit 503 to the voltage control circuit 506, but to transmit the output to the electric storage circuit 505. The electric storage circuit 505 stores generated electric power therein. When it is necessary to output a voltage from the vibration power generating device 500, the output switching circuit 504 switches between the circuits so as to output electric power from the voltage control circuit 506. When amount of electricity generated is less, the output switching circuit 504 switches between the circuits so as to output electric power stored in the electric storage circuit 505. The output from the output switching circuit 504 is controlled to be a desired output voltage VOUT by the voltage control circuit 506 to be output to the outside of the vibration power generating device 500.

As described above, an output voltage from the vibration power generating device 500 fluctuates by various factors. In order to respond thereto, it is desirable that the VDC2 is set to a voltage slightly higher than a voltage VOUT to be finally output. By carrying out the setting in this way, it is possible to uniform an output voltage with respect to even a minimal voltage fluctuation. As an example, the case where electric power is output at a voltage of 1.8 V will be described. In this case, when the VDC2 is set to 1.8 V, and an output voltage from the vibration power generator is lowered, an output voltage of the vibration power generating device 500 as well is lowered. Meanwhile, for example, provided that the VDC2 is set to 2 V, it is possible to sufficiently perform the control even for lowering in voltage of 0.2 V. Accordingly, it is possible to stably supply electric power with a constant output voltage by the setting of VDC2>VOUT.

Fifth Embodiment

Figure 13:
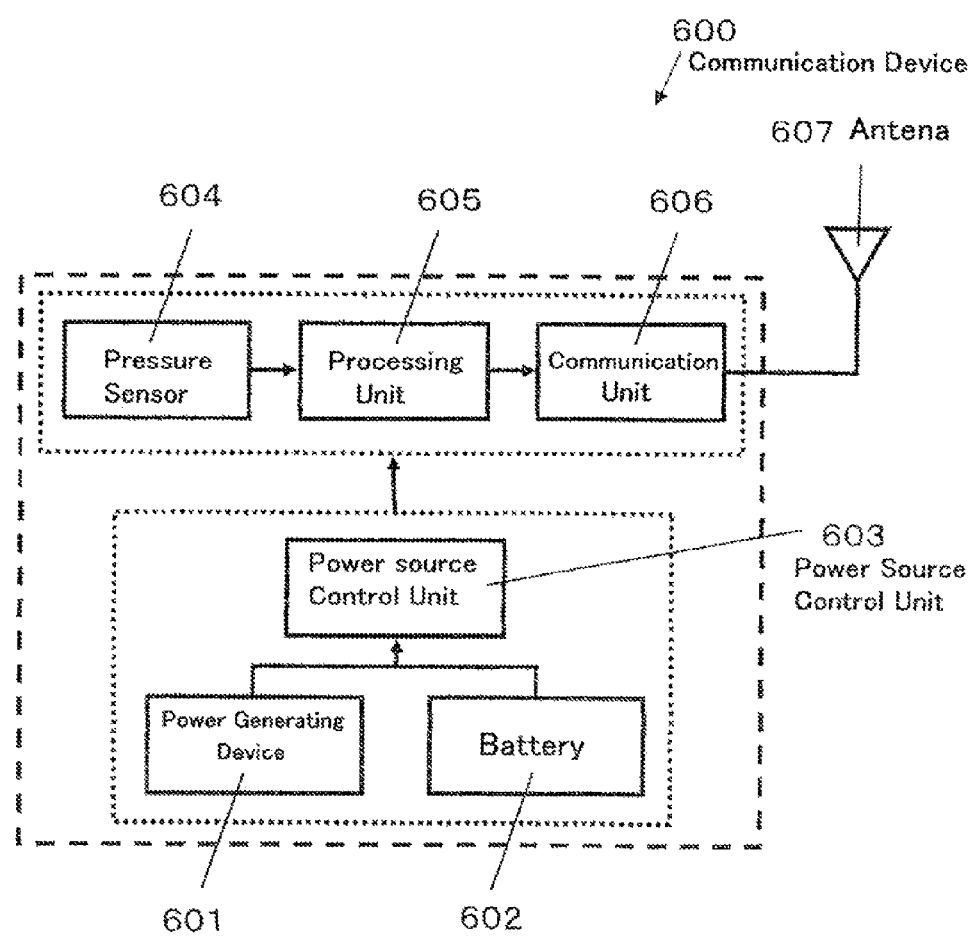
FIG. 13 is a view showing a communication device according to a fourth embodiment of the present invention.
Figure 14:
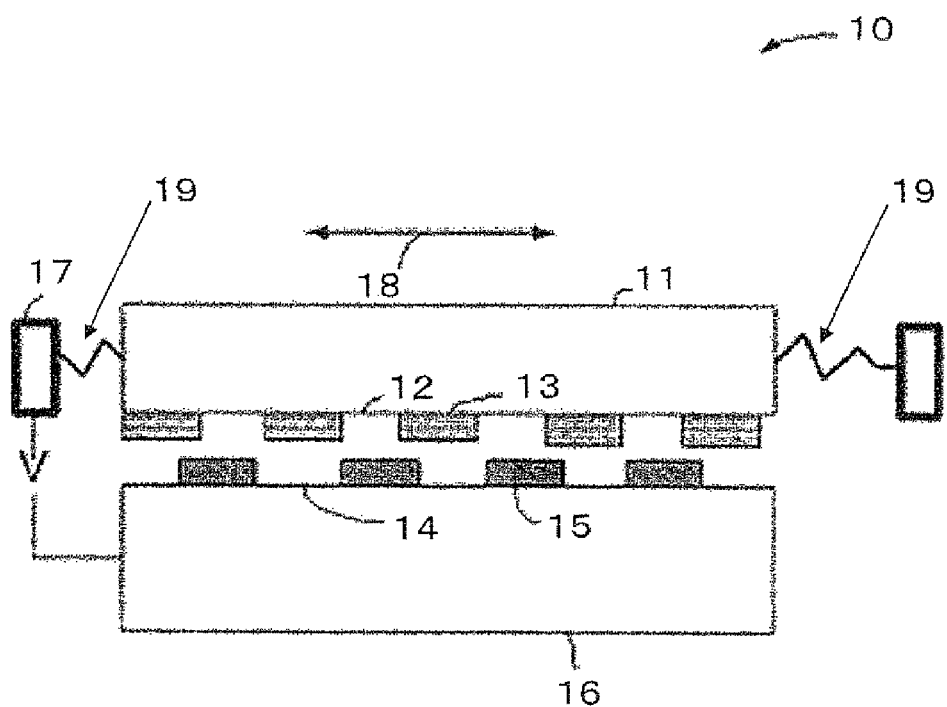
FIG. 14 is a top view of a conventional static induction vibration power generator.
Figure 15:
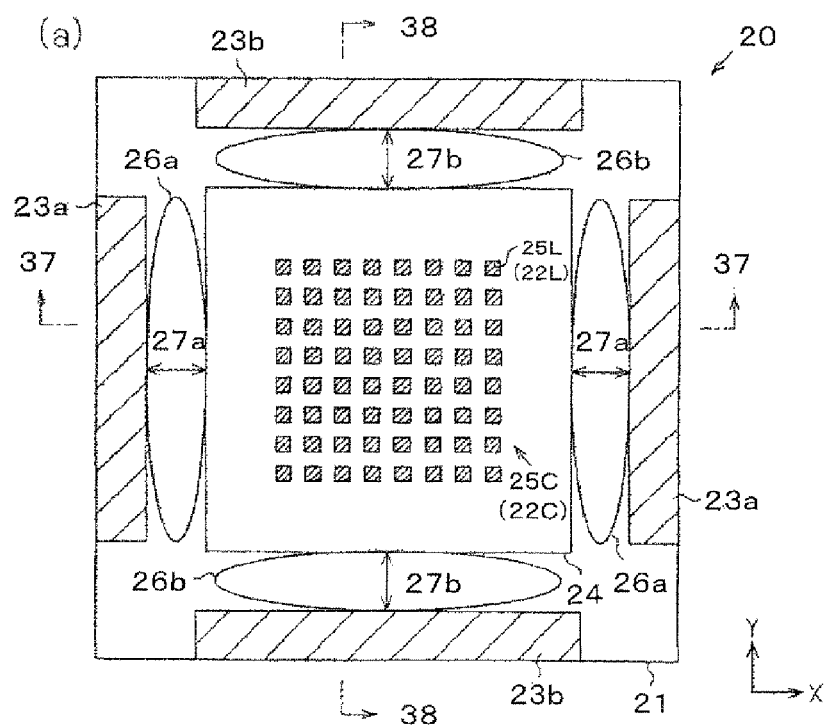
FIGS. 15(a) and (b) are top views of a conventional static induction vibration power generator in which vibrations in multi-axial directions are converted into electric power.
Figure 15:
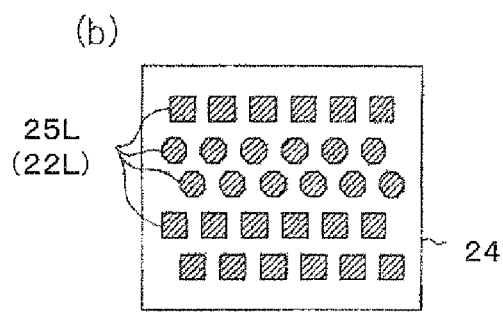

FIG. 13 is a block diagram of a communication device used for a tire-pressure monitoring system mounted in an automobile. In FIG. 13, a vibration power generating device of the fourth embodiment is shown as a generating device.

In FIG. 13, a communication device 600 includes a power generating device 601 performing electrical generation by a vibration, a battery 602 serving as a main power source of the communication device or a sub-power source of the power generating device 601, a power source control unit 603 which switches between an output from the power generating device 601 and an output from the battery 602 to supply it to the circuit unit, a pressure sensor 604 which measures a tire pressure, a processing unit 605 which processes an output from the pressure sensor to transmit it to a communication unit, a communication unit 606 which converts an input signal from the processing unit 605 into a high-frequency signal, to transmit it to an antenna 607, and the antenna 607.

The operation of the communication device 600 configured as described above will be described.

Electric power required for operating the pressure sensor 604, the processing unit 605 and the communication unit 606 are supplied from the power generating device 601 or the battery 602 via the power source control unit 603. The pressure sensor 604 measures a tire pressure and converts a measurement result into a voltage signal to input it to the processing unit 605. The signal processed in the processing unit 605 is input to the communication unit 606, to be propagated as a high-frequency signal from the antenna 607.

In the communication device operating in this way, in the case where the vibration power generating device is utilized as a power source of the communication device, it is possible to decrease the number of maintenance works such as battery exchanges, or it is possible to make battery exchange unnecessary. This improves the convenience of the communication device itself, and further contributes to resource saving and environmental protection.

In the present embodiment, the example in which the vibration power generating device and the battery are both used is shown. As long as it is possible for output electric power from the vibration power generating device to sufficiently cover electric power consumed by the circuits such as the pressure sensor, the processing unit, the communication unit and the like, and electric power required for communication, only the vibration power generating device may be used as a power source. In that case, the battery and the power source control unit are unnecessary, which is advantageous to the point of downsizing of devices.

In the present embodiment, the example in which the vibration power generator shown in the first to third embodiments and the vibration power generating device are used is shown. It goes without saying that the vibration power generator may be another vibration power generator as long as it is possible to convert an externally-applied force or vibration into electric power, and in that case, the same effects are obtained.

The vibration power generator and the vibration power generating device of the present invention may be used as a main power source or a sub-power source in electrical equipment other than a communication device. Specifically, those may be used for wrist watches, thermometers, temperature indicators, pedometers, remote controllers, mobile audio products, mobile devices for keyless entry, hearing aids, cardiac pacemakers, mobile telephones and game machines.

It should be noted that the components in the embodiments disclosed in the specification are merely exemplified, and are not intended to be limiting. The scope of the present invention is shown by, not the above-described explanation, but the scope of claims, and is intended to encompass all modifications within the spirit and scope equal to the scope of claims.

The vibration power generator of the present invention is capable of vibrating in two directions of the direction of the X-axis and the direction of the Y-axis, to perform electrical generation, and is capable of generating electricity at an output equal to that of the conventional single-axial direction vibration power generator, in any direction of the two directions. Therefore, the vibration power generator of the present invention is useful as a static induction vibration power generator. Further, the vibration power generator of the present invention is extremely useful for usage of low electric power wireless communication modules or the like.

What is claimed is:

1. A vibration power generator comprising:
a first electrode disposed on a first substrate; and
a second electrode disposed on a second substrate;
wherein at least one of the first electrode and the second electrode is configured to vibrate in a first axial direction in a plane parallel to the first and second substrates and a second axial direction perpendicular to the first axial direction,
the first electrode includes at least one of rectangular and square conductor parts having sides parallel to the first axial direction and the second axial direction and is arranged in a checkerboard pattern on the first substrate,
the second electrode includes at least one of rectangular and square conductor parts having sides parallel to the first axial direction and the second axial direction and is arranged in a checkerboard pattern on the second substrate,
at least one of the first electrode and the second electrode includes film retaining electric charges, and
the first electrode and the second electrode face each other so as to have a clearance therebetween,
wherein the second electrode includes
a first electrode group, the conductor parts thereof being arranged in a checkerboard pattern, and
a second electrode group, the at least one of the rectangular and square conductor parts thereof having sides parallel to the first axial direction and the second axial direction being arranged in a checkerboard pattern on respective lattices without the conductor parts in the first electrode group, and wherein
the first electrode group and the second electrode group are not electrically connected to each other.

2. A vibration power generator comprising:
a first electrode disposed on a first substrate; and
a second electrode disposed on a second substrate;
wherein at least one of the first electrode and the second electrode is configured to vibrate in a first axial direction in a plane parallel to the first and second substrates and a second axial direction perpendicular to the first axial direction,
the first electrode includes at least one of rectangular and square conductor parts having sides parallel to the first axial direction and the second axial direction and is arranged in a checkerboard pattern on the first substrate,
the second electrode includes at least one of rectangular and square conductor parts having sides parallel to the first axial direction and the second axial direction and arranged in a checkerboard pattern on the second substrate,
at least one of the first electrode and the second electrode includes a film retaining electric charges, and
the first electrode and the second electrode face each other so as to have a clearance therebetween,
wherein the vibration power generator further comprises
a fixation structure; and
a variable structure disposed between the fixation structure and the first substrate,
wherein the variable structure and the first substrate are connected in the direction parallel to the first axial direction through a first elastic structure,
the fixation structure and the variable structure are connected in the direction parallel to the second axial direction through a second elastic structure, and
the second substrate and the fixation structure are fixed each other.

3. A vibration power generator comprising:
a first electrode disposed on a first substrate; and
a second electrode disposed on a second substrate;
wherein at least one of the first electrode and the second electrode is configured to vibrate in a first axial direction in a plane parallel to the first and second substrates and a second axial direction perpendicular to the first axial direction,
the first electrode includes at least one of rectangular and square conductor parts having sides parallel to the first axial direction and the second axial direction and is arranged in a checkerboard pattern on the first substrate, the second electrode includes at least one of rectangular and square conductor parts having sides parallel to the first axial direction and the second axial direction and is arranged in a checkerboard pattern on the second substrate, at least one of the first electrode and the second electrode includes a film retaining electric charges, and the first electrode and the second electrode face each other so as to have a clearance therebetween, wherein at least one of the first electrode and the second electrode includes at least film-type conductive parts as the conductor parts and a silicon dioxide film as the film retaining electric charges, the film-type conductive parts are formed on the first substrate or the second substrate, the silicon dioxide film is covered on top surface, bottom surface, and side surfaces thereof with an insulating film, and the conductive parts are electrically connected, wherein in at least one of the first electrode and the second electrode including the silicon dioxide film, the silicon dioxide film is formed as a plurality of independent electrically-charged parts, and at least one of the first electrode and the second electrode is composed of an electrode group including electrically-charged parts retaining positive electric charges and an electrode group including electrically-charged parts retaining negative electric charges.

4. A vibration power generator comprising:

a first electrode disposed on a first substrate; and a second electrode formed on a second substrate; wherein at least one of the first electrode and the second electrode is configured to vibrate in a first axial direction in a plane parallel to the first and second substrates and a second-axial direction perpendicular to the first axial direction, the first electrode includes at least one of rectangular and square conductor parts having sides parallel to the first axial direction and the second axial direction and arranged in a checkerboard pattern on the first substrate, the checkboard pattern comprises a first line including the conductor parts and blanks, each blank of the blanks being a portion without the conductor part, the conductor parts and the blanks beings alternately arranged in the first line, and a second line adjacent to the first line and including the conductor parts and blanks, each blank of the blanks in the second line being arranged adjacent to one of the conductor parts in the first line, and each conductor part of the conductor parts in the second line being arranged adjacent to one of the blanks in the first line, the second electrode includes at least one of rectangular and square conductor parts having sides parallel to the first axial direction and the second axial direction and is arranged in a checkerboard pattern on the second substrate, at least one of the first electrode and the second electrode includes film retaining electric charges, and the first electrode and the second electrode face each other so as to have a clearance therebetween, wherein the second electrode includes a first electrode group, the conductor parts thereof being arranged in a checkerboard pattern, and a second electrode group, the at least one of rectangular and square conductor parts thereof having sides parallel to the first axial direction and the second axial direction being arranged in a checkerboard pattern on respective lattices without the conductor parts in the first electrode group, and wherein the first electrode group and the second electrode group are not electrically connected to each other.

5. The vibration power generator according to claim 4, further comprising a fixation structure, wherein the fixation structure and the first substrate are connected through an elastic structure, the second substrate and the fixation structure are fixed to each other, and a spring constant in the first axial direction of the elastic structure configured to cause the first substrate to vibrate in a direction parallel to the first axial direction and a spring constant in the second axial direction of the elastic structure configured to cause the first substrate to vibrate in a direction parallel to the second axial direction are different from each other.

6. The vibration power generator according to claim 4, further comprising a fixation structure, wherein the fixation structure and the second substrate are connected through an elastic structure, the first substrate and the fixation structure are fixed to each other, and a spring constant in the first axial direction of the elastic structure configured to cause the second substrate to vibrate in a direction parallel to the first axial direction and a spring constant in the second axial direction of the elastic structure configured to cause the second substrate to vibrate in a direction parallel to the second axial direction are different from each other.

7. The vibration power generator according to claim 4, further comprising:

a fixation structure; and a variable structure disposed between the fixation structure and the first substrate; wherein the variable structure and the first substrate are connected in the direction parallel to the first axial direction through a first elastic structure, the fixation structure and the variable structure are connected in the direction parallel to the second axial direction through a second elastic structure, and the second substrate and the fixation structure are fixed to each other.

8. The vibration power generator according to claim 4, wherein a first resonant frequency and a second resonant frequency differ each other, and wherein the first resonant frequency is a resonant frequency of vibration in the first axial direction of at least one of the first electrode and the second electrode, and the second resonant frequency is a resonant frequency of vibration in the second axial direction of the at least one electrode.

9. The vibration power generator according to claim 8, wherein the first resonant frequency and the second resonant frequency are different by at least 20%.

10. The vibration power generator according to claim 4, wherein a circumscribed area of a region on which the second electrode is disposed on the second substrate is larger than a circumscribed area of a region on which the first electrode is formed on the first substrate.

11. The vibration power generator according to claim 4, wherein a circumscribed area of a region on which the second electrode is disposed on the second substrate is larger than a circumscribed area of a region on which the first electrode is formed on the first substrate.

12. A generating device comprising the vibration power generator according to claim 4.

13. A communication device comprising the generating device according to claim 12.

14. The communication device according to claim 13, further comprising a battery.

15. A generating device comprising the vibration power generator according to claim 4, wherein an output terminal from the first electrode group and an output terminal from the second electrode group are respectively connected to a full-wave rectifier circuit.

16. A vibration power generating device comprising: the vibration power generator according to claim 4;
   a rectifier circuit configured to rectify an AC output voltage from the vibration power generator to convert the AC output voltage into a DC voltage;
   a voltage conversion circuit configured to convert the DC voltage output from the rectifier circuit to a predetermined voltage level;
   an electric storage circuit configured to store electric power generated by the vibration power generator when an output from the vibration power generating device is unnecessary;
   a voltage control circuit configured to control an output voltage from the voltage conversion circuit or the electric storage circuit to be a predetermined voltage; and
   an output switching circuit configured to switch between the electric storage circuit and the voltage control circuit as a circuit to transmit an output from the voltage conversion circuit thereto.

17. The vibration power generating device according to claim 16, wherein an output voltage from the voltage conversion circuit is set to be higher than an output voltage from the voltage control circuit.

* * * * *